United States Patent
Brandstaetter et al.

(10) Patent No.: US 10,160,453 B1
(45) Date of Patent: Dec. 25, 2018

(54) VEHICLE POWERTRAIN AND METHOD FOR CHANGING A GEAR DRIVING CONFIGURATION OF A TRANSMISSION OF THE VEHICLE POWERTRAIN

(71) Applicant: BRP-POWERTRAIN GMBH & CO KG, Gunskirchen (AT)

(72) Inventors: Werner Brandstaetter, Meggenhofen (AT); Walter Hinterberger, Grieskirchen (AT); Richard Winkoff, Marchtrenk (AT); Heinz Kusel, Pennewang (AT); Roger Rioux, Sherbrooke (CA)

(73) Assignee: BRP-ROTAX GMBH & CO. KG, Gunskirchen (AT)

( * ) Notice: Subject to any disclaimer, the term of this patent is extended or adjusted under 35 U.S.C. 154(b) by 446 days.

(21) Appl. No.: 15/012,373

(22) Filed: Feb. 1, 2016

Related U.S. Application Data

(60) Provisional application No. 62/110,105, filed on Jan. 30, 2015.

(51) Int. Cl.
*B60W 30/19* (2012.01)
*B60W 30/188* (2012.01)
*B60W 10/11* (2012.01)
*B60W 10/06* (2006.01)
*B60W 10/107* (2012.01)

(52) U.S. Cl.
CPC ........... *B60W 30/19* (2013.01); *B60W 10/06* (2013.01); *B60W 10/107* (2013.01); *B60W 10/11* (2013.01); *B60W 30/1882* (2013.01); *B60W 2510/0638* (2013.01); *B60W 2510/104* (2013.01); *B60W 2510/1005* (2013.01); *B60W 2510/1015* (2013.01); *B60W 2520/10* (2013.01); *B60W 2540/16* (2013.01); *B60W 2710/0644* (2013.01); *B60W 2710/1005* (2013.01)

(58) Field of Classification Search
CPC .... B60W 10/06; B60W 10/11; B60W 10/107; B60W 30/1882; B60W 30/188; B60W 30/19
See application file for complete search history.

(56) References Cited

U.S. PATENT DOCUMENTS

| 4,493,228 A | 1/1985 | Vukovich et al. |
|---|---|---|
| 4,593,580 A | 6/1986 | Schulze |

(Continued)

*Primary Examiner* — Erin D Bishop
(74) *Attorney, Agent, or Firm* — BCF LLP

(57) ABSTRACT

A method for changing a gear driving configuration of a discrete gear transmission (DGT) in a powertrain including an engine operatively connected to a continuously variable transmission (CVT). The DGT has a DGT input shaft operatively connected to a CVT driven pulley, a plurality of gears having a plurality of gear driving configurations and a DGT output shaft selectively operatively connected to the DGT input shaft based on the gear driving configuration. Responsive to a gear shift request, a target driven pulley speed is determined for synchronizing the DGT input shaft with the DGT output shaft for the desired gear driving configuration. The engine is controlled to change an engine speed to the target engine speed corresponding to the determined target driven pulley speed. Responsive to the DGT input shaft being synchronized with the DGT output shaft, the current gear driving configuration is changed to the desired gear driving configuration.

20 Claims, 24 Drawing Sheets

(56) References Cited

U.S. PATENT DOCUMENTS

| | | | |
|---|---|---|---|
| 4,674,359 A | 6/1987 | Hattori | |
| 5,676,017 A * | 10/1997 | Allen, Jr. | B60W 10/06 477/908 |
| 7,824,308 B2 * | 11/2010 | Liu | B60W 10/06 477/109 |
| 8,942,876 B2 * | 1/2015 | Dai | B60W 20/30 701/22 |
| 2011/0245033 A1 * | 10/2011 | Sato | B60K 6/442 477/3 |

* cited by examiner

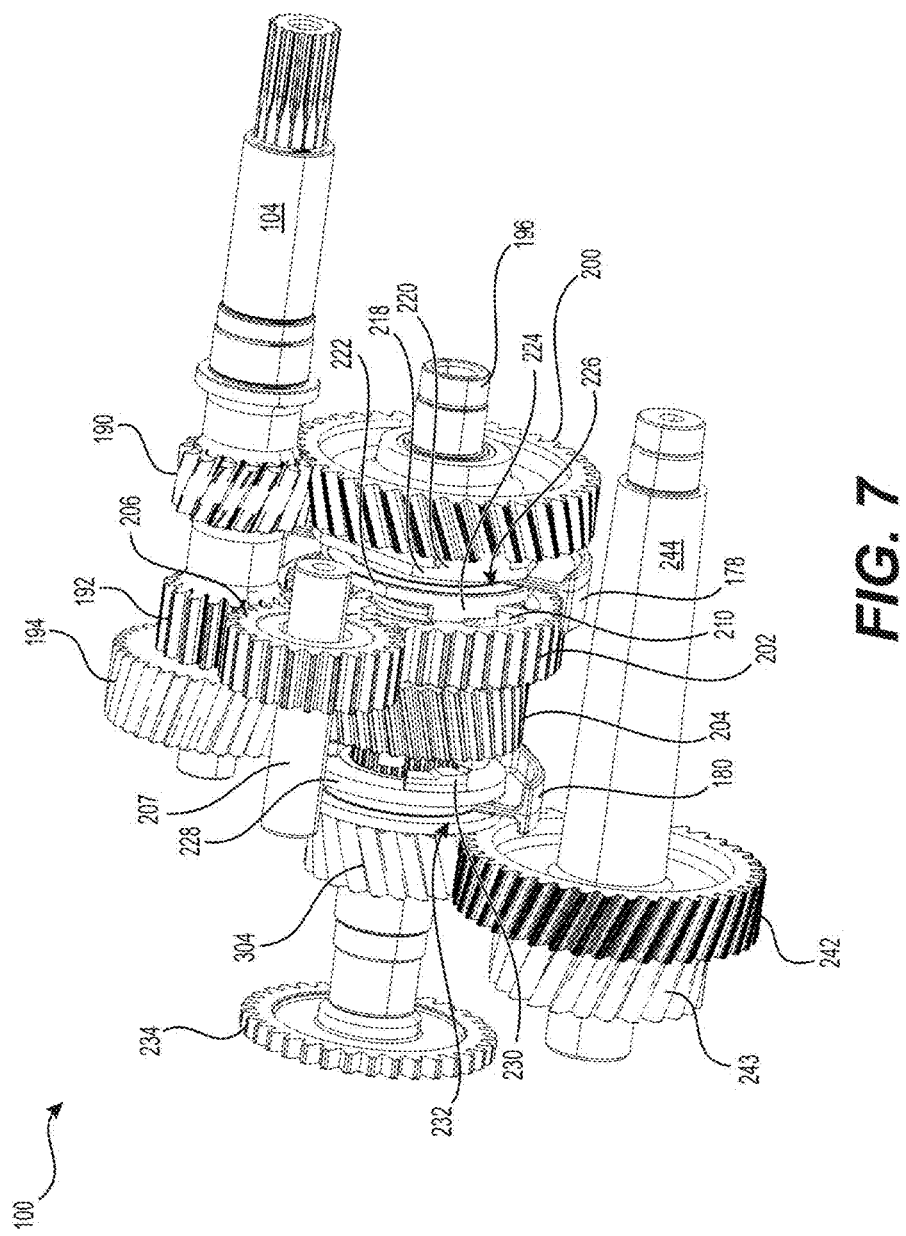

| SHIFT POSITION | ANGLE | POSITION INDEX |
|---|---|---|
| L | 330° | 1 |
| N₁ | 270° | 2 |
| H | 210° | 3 |
| N₂ | 150° | 4 |
| R | 90° | 5 |
| N₃ | 30° | 6 |
|  | (ERROR) | 0 |

SHIFT DRUM POSITIONS

POSITION CHANGE REQUEST TABLE (ANGLE σ)

| SHIFT REQUEST | 0 ERROR | 1 Lo | 2 N1 | 3 Hi | 4 N2 | 5 R | 6 N3 |
|---|---|---|---|---|---|---|---|
| Hi | 210 | 270 | 210 | 210 | 210 | 150 | 210 |
| Lo | 330 | 330 | 330 | 270 | 330 | 330 | 330 |
| N | 270 | 270 | 270 | 270 | 150 | 30 | 30 |
| R | 90 | 30 | 90 | 150 | 90 | 90 | 90 |
| P | 270 | 270 | 270 | 270 | 270 | 270 | 270 |

CURRENT SHIFT DRUM POSITION

FIG. 11

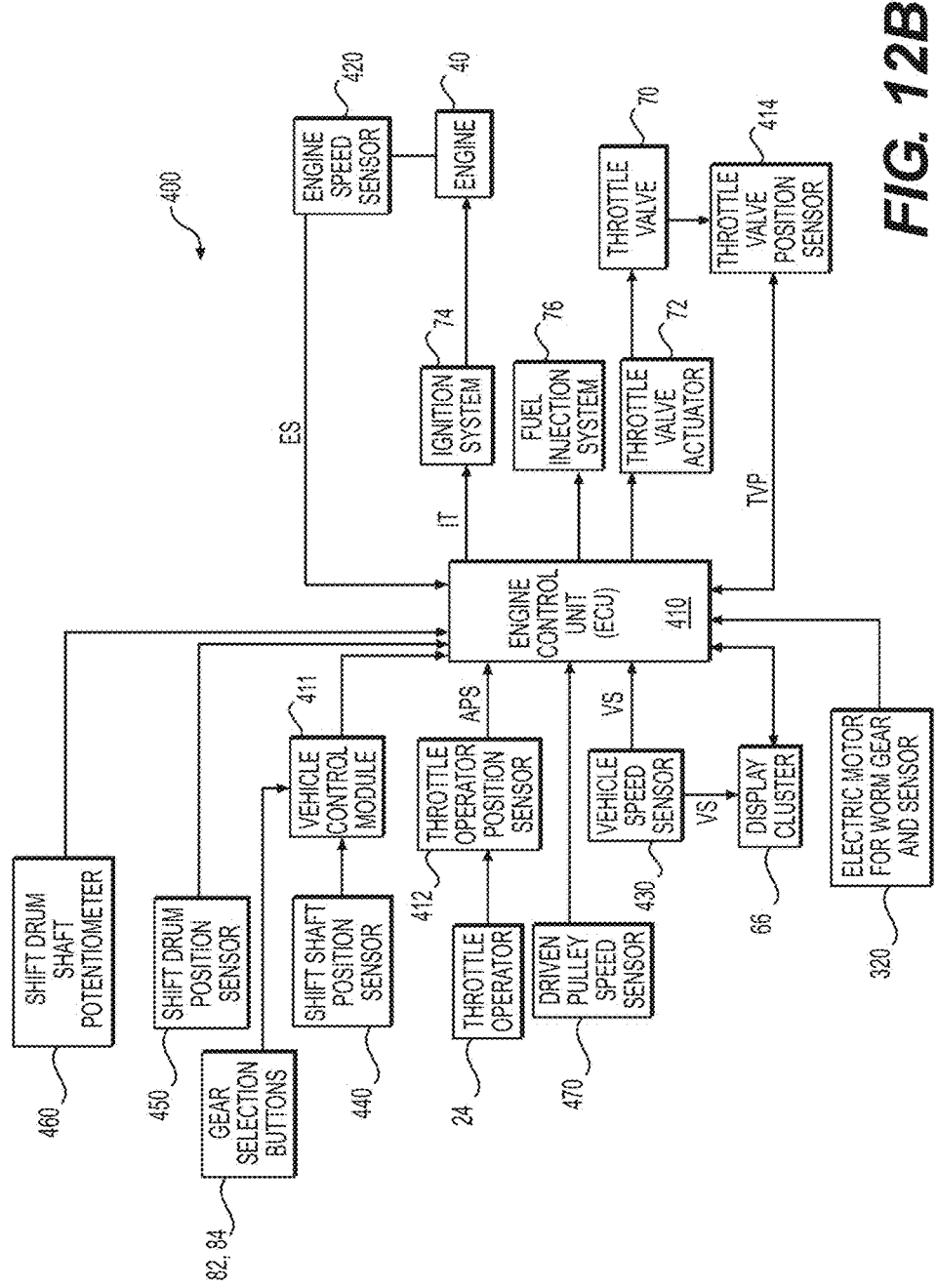

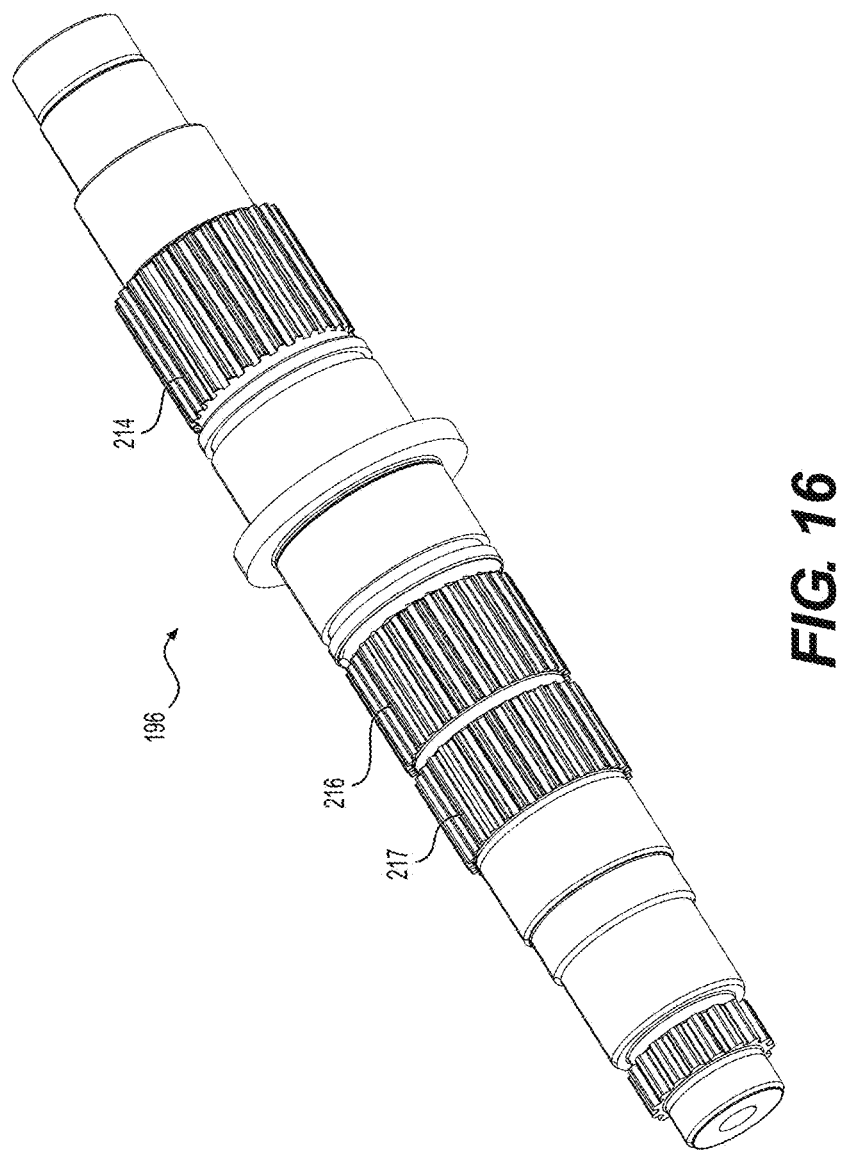

US 10,160,453 B1

VEHICLE POWERTRAIN AND METHOD FOR CHANGING A GEAR DRIVING CONFIGURATION OF A TRANSMISSION OF THE VEHICLE POWERTRAIN

CROSS-REFERENCE

The present application claims priority to U.S. Provisional Patent Application No. 62/110,105 filed on Jan. 30, 2015, the entirety of which is incorporated herein by reference.

FIELD OF THE TECHNOLOGY

The present technology relates to vehicle powertrains and methods for changing a driving configuration of a transmission of the vehicle powertrain.

BACKGROUND

Vehicle transmissions typically have multiple gears. For a given speed of rotation of an input shaft of the transmission, each gear when engaged results in a different speed of rotation and/or direction of rotation of an output shaft of the transmission.

One example of a vehicle transmission has a park position, a reverse position, a neutral position, a high position, and low position. In the park position, the output shaft is locked and cannot rotate. In the reverse position, the output shaft rotates in a direction that causes the vehicle to move in a reverse direction. In the high and low positions, the output shaft rotates in a direction that causes the vehicle to move in a forward direction. In the low position, the output shaft rotates slower than in the high position, however more torque is provided to the wheels in the low position than in the high position. The operator of the vehicle having the transmission selects the position of the transmission via a gear selector having positions corresponding to each of the positions of the transmission.

In some vehicles such as all terrain vehicles (ATVs) and the like, there is a large difference between the transmission ratio of one gear (for example, a high gear) and another gear (for example, the low gear). In such vehicles, the transmission ratio often changes by a factor of two or more when the gear is changed. Due to the large difference in rotation speeds of the various transmission shafts, the operator of the vehicle has to typically stop the vehicle momentarily before engaging a desired gear. Having to stop the vehicle momentarily to engage a different gear is inconvenient and leads to an unsatisfactory driving experience. It would be desirable to be able to change gears while driving a vehicle without having to momentarily stop the vehicle.

Therefore, there is a need for a vehicle transmission which facilitates the engagement of the gears of the transmission.

SUMMARY

It is an object of the present technology to ameliorate at least some of the inconveniences mentioned above.

In accordance with one aspect of the present technology, there is provided a method for changing a gear driving configuration of a discrete gear transmission in a powertrain of a vehicle. The powertrain includes an engine and an engine control unit (ECU) for controlling an operation of the engine. A continuously variable transmission (CVT) has a driving pulley operatively connected to the engine and a driven pulley. A discrete gear transmission (DGT) operatively connects the CVT to at least one wheel of the vehicle. The DGT includes a DGT input shaft operatively connected to the driven pulley of the CVT, a DGT output shaft configured to be operatively connected to the at least one wheel of the vehicle, and a plurality of gears having a plurality of gear driving configurations. The DGT output shaft is selectively operatively connected to the DGT input shaft based on the plurality of gear driving configurations of the plurality of gears. The method comprises responsive to a gear shift request for changing a current gear driving configuration to a desired gear driving configuration of the plurality of gear driving configurations of the plurality of gears, determining a target driven pulley speed for synchronizing the DGT input shaft with the DGT output shaft for the desired gear driving configuration. A target engine speed corresponding to the determined target driven pulley speed is determined. The engine is controlled to change an engine speed to the target engine speed. Responsive to the DGT input shaft being synchronized with the DGT output shaft for the desired gear driving configuration, the current gear driving configuration of the plurality of gears is changed to the desired gear driving configuration.

In some implementations, the target engine speed is determined based on a predefined ratio map of driven pulley speed as a function of one of: a driving pulley speed and the engine speed.

In some implementations, the target driven pulley speed is determined based on a vehicle speed and the desired gear driving configuration.

In some implementations, controlling the engine to change the engine speed to the target engine speed includes obtaining the engine speed and the driven pulley speed. The method also includes obtaining, from a predefined correction table of a plurality of engine speed correction values as a function of driven pulley speed, an engine speed correction value corresponding to the target driven pulley speed and a current driven pulley speed. The operation of the engine is controlled in accordance with the obtained engine speed correction value.

In some implementations, controlling the engine in accordance with the obtained engine speed correction value comprises controlling the engine such that the engine speed approaches the target engine speed in an oscillatory manner.

In some implementations, a timer is initialized before controlling the engine to change engine speed to the target engine speed. Controlling the engine to change engine speed to the target engine speed includes determining if the driven pulley speed is within a predefined range about the target driven pulley speed and determining if a timer value of the timer has exceeded a predefined threshold timer value. Responsive to the driven pulley speed being outside a predefined range about the target driven pulley speed and the timer value exceeding the predefined threshold timer value, an error procedure is initiated. Responsive to the driven pulley speed being outside a predefined range of the target driven pulley speed and the timer value being less than the predefined threshold timer value, the engine is continued to be controlled to obtain the target engine speed.

In some implementations, changing the current gear driving configuration to the desired gear driving configuration includes changing the current gear driving configuration of the plurality of gears to a neutral gear driving configuration before controlling the engine to change the engine speed to the target engine speed. The neutral gear driving configuration of the plurality of gears is changed to the desired gear driving configuration after controlling the engine to change the engine speed to the target engine speed and if the desired gear driving configuration is other than the neutral gear driving configuration.

In some implementations, changing the current gear driving configuration of the plurality of gears to the neutral gear driving configuration includes controlling the engine to minimize torque on the DGT output shaft before changing the current gear driving configuration of the plurality of gears to the neutral gear driving configuration.

In some implementations, changing the current gear driving configuration to the desired gear driving configuration further includes storing a value of an operational parameter of the vehicle before changing the current gear driving configuration of the plurality of gears to the neutral gear driving configuration, the value of the operational parameter being a stored value of the operational parameter. After changing the current gear driving configuration to the desired gear driving configuration, restoring operation of the vehicle to return the operational parameter to the stored value of the operational parameter.

In some implementations, the operational parameter is an engine torque request.

In some implementations, returning the operational parameter to the stored value of the operational parameter comprises returning the operational parameter to the stored value of the operational parameter in accordance with a predefined ramping model.

In some implementations, changing the current gear driving configuration of the plurality of gears to the neutral gear driving configuration occurs responsive to a shift condition being satisfied.

In some implementations, the DGT includes a shift drum being moveable to any one of a plurality of positions, each position of the plurality of positions corresponding to one of the plurality of gear driving configurations of the plurality of gears. The shift drum is moveable from any one position of the plurality of positions to any other position of the plurality of positions in any one of two directions of actuation. A shift drum actuator is operatively connected to the shift drum for actuating the shift drum to any one of the plurality of positions, the ECU being communicatively coupled to the shift drum actuator for controlling actuation of the shift drum. Changing the current gear driving configuration of the plurality of gears to the desired gear driving configuration includes determining a current position of the shift drum corresponding to the current gear driving configuration and determining a target position of the shift drum corresponding to the desired gear driving configuration of the plurality of gears. The shift drum is actuated in one of the two directions of actuation to dispose the shift drum in the target position. The one of the two directions of actuation is selected based on the current position of the shift drum and the target position of the shift drum.

In some implementations, changing the current gear driving configuration of the plurality of gears to the desired gear driving configuration includes changing the current gear driving configuration of the plurality of gears to a neutral gear driving configuration before controlling the engine to change engine speed to the target engine speed. The neutral gear driving configuration of the plurality of gears is then changed to the desired gear driving configuration after controlling the engine to change engine speed to the target engine speed. The plurality of positions of the shift drum includes at least a first neutral position corresponding to the neutral gear driving configuration and a second neutral position corresponding to the neutral gear driving configuration. Changing the current gear driving configuration of the plurality of gears to the neutral gear driving configuration before controlling the engine to change engine speed to the target engine speed includes actuating the shift drum to move the shift drum from the current position to an intermediate position before controlling the engine to change engine speed to the target engine speed. Changing the neutral gear driving configuration of the plurality of gears to the desired gear driving configuration after controlling the engine to change engine speed to the target engine speed comprises actuating the shift drum to move the shift drum from the intermediate position to the target position. The intermediate position is one of the first neutral position and the second neutral position, the intermediate position being selected based on the current position and the target position.

In accordance with another aspect of the present technology, there is provided a vehicle including a frame, at least one wheel connected to the frame, and an engine supported by the frame. An engine control unit (ECU) is configured to control an operation of the engine. A continuously variable transmission (CVT) has a driving pulley operatively connected to the engine and a driven pulley. A discrete gear transmission (DGT) includes a DGT input shaft operatively connected to the driven pulley of the CVT and a plurality of gears being disposed in one of a plurality of gear driving configurations. A DGT output shaft is selectively driven by the DGT input shaft based on the plurality of gear driving configurations of the plurality of gears and operatively connected to the at least one wheel. A shift drum is rotatable to any one of a plurality of angular positions, each angular position of the plurality of angular positions corresponding to one of the plurality of gear driving configurations. A shift drum actuator is operatively connected to the shift drum for actuating the shift drum, the ECU being communicatively coupled to the shift drum actuator for controlling actuation of the shift drum. A gear selector operable by a driver of the vehicle to select a desired gear driving configuration of the plurality of gear driving configurations, the gear selector being communicatively coupled to the ECU for providing a signal indicative of a gear shift request for the desired gear driving configuration. An engine speed sensor is configured to sense a rotational speed of one of: the driving pulley and a first element connected between the engine and the driving pulley. The engine speed sensor is communicatively coupled to the ECU for sending a engine speed signal thereto indicative of the engine speed. A driven pulley speed sensor is configured to sense a rotational speed of one of: the driven pulley, the DGT input shaft and a second element connected between the driven pulley and the DGT input shaft. The driven pulley speed sensor is communicatively coupled to the ECU for sending a signal thereto indicative of a driven pulley speed of the driven pulley. The ECU is configured to determine a target engine speed responsive to receiving the signal indicative of the gear shift request and to control the engine to change the engine speed to the target engine speed. The target engine speed is determined based on a target driven pulley speed for the desired gear driving configuration. The target driven pulley speed is determined to synchronize the DGT input shaft with the DGT output shaft for the desired gear driving configuration. The ECU is further configured to control the shift drum actuator to rotate the shift drum to the angular position of the plurality of angular positions corresponding to the desired gear driving configuration responsive to the DGT input shaft being synchronized with the DGT output shaft.

In some implementations, the ECU has access to a ratio map of driven pulley speed as a function of engine speed, and the target engine speed is determined based on the ratio map.

In some implementations, a vehicle speed sensor is configured to sense a rotational speed of one of: the at least one wheel, the DGT output shaft and a third element connected between the DGT output shaft and the at least one wheel. The vehicle speed sensor is communicatively coupled to the ECU to send a signal thereto indicative of a vehicle speed. The target driven pulley speed is determined based on the vehicle speed when the gear shift request is received.

In some implementations, the DGT further includes a parking lock shaft rotatable independently of the shift drum. The parking lock shaft is rotatable to a lock position to prevent rotation of the DGT output shaft. The parking lock shaft is operatively connected to the gear selector for being rotated to the lock position.

In some implementations, the shift drum is rotatable by 360 degrees.

In some implementations, a shift drum position sensor is coupled to at least one of the shift drum and the shift drum actuator, the shift drum position sensor being communicatively connected to the ECU to send a signal thereto indicative of a current position of the shift drum.

In accordance with another aspect of the present technology, there is provided a powertrain for a vehicle. The powertrain includes an engine and an engine control unit (ECU) configured to control an operation of the engine. A continuously variable transmission (CVT) has a driving pulley operatively connected to the engine and a driven pulley. A discrete gear transmission (DGT) includes a DGT input shaft operatively connected to the driven pulley of the CVT, and a plurality of gears disposed in one of a plurality of gear driving configurations. A DGT output shaft is selectively driven by the DGT input shaft based on the gear driving configuration of the plurality of gears and configured to be operatively connected to at least one wheel of the vehicle. A shift drum is rotatable to any one of a plurality of angular positions, each angular position of the plurality of angular positions corresponding to one of the plurality of gear driving configurations of the plurality of gears. A shift drum actuator is operatively connected to the shift drum for actuating the shift drum, the ECU being communicatively coupled to the shift drum actuator for controlling actuation of the shift drum. An engine speed sensor is configured to sense a rotational speed of one of: the driving pulley and a first element connected between the engine and the driving pulley. The engine speed sensor is communicatively coupled to the ECU for sending a engine speed signal thereto indicative of the engine speed. A driven pulley speed sensor is configured to sense a rotational speed of one of: the driven pulley, the DGT input shaft and a second element connected between the driven pulley and the DGT input shaft, the driven pulley speed sensor is communicatively coupled to the ECU for sending a signal thereto indicative of a driven pulley speed of the driven pulley. The ECU is configured to determine a target engine speed responsive to receiving the signal indicative of a gear shift request to a desired gear driving configuration and to control the engine to change the engine speed to the target engine speed. The target engine speed is determined based on a target driven pulley speed for the desired gear driving configuration. The target driven pulley speed is determined to synchronize the DGT input shaft with the DGT output shaft for the desired gear driving configuration. The ECU is further configured to control the shift drum actuator to rotate the shift drum to the angular position of the plurality of angular positions corresponding to the desired gear driving configuration responsive to the DGT input shaft being synchronized with the DGT output shaft.

For the purpose of this application, terms related to spatial orientation such as downwardly, rearward, forward, front, rear, left, right, above and below are as they would normally be understood by a driver of the vehicle sitting thereon in an upright position with the vehicle in a straight ahead orientation (i.e. not steered left or right), and in an upright position (i.e. not tilted).

Implementations of the present vehicle each have at least one of the above-mentioned object and/or aspects, but do not necessarily have all of them. It should be understood that some aspects of the present vehicle that have resulted from attempting to attain the above-mentioned object may not satisfy this object and/or may satisfy other objects not specifically recited herein.

Additional and/or alternative features, aspects, and advantages of implementations of the present vehicle will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 7 is a perspective view, taken from a rear, top and right side, of some of the internal components of the transmission of FIG. 3A;

FIG. 11 is a position change request table for changing the angular position of the shift drum of 6A;

FIG. 12B is block diagram of a control system for controlling operation of the transmission of the vehicle of FIG. 1;

FIG. 16 is a perspective view, taken from a front, top and right side, of a countershaft of the transmission of FIG. 4 shown in isolation;

DETAILED DESCRIPTION

Embodiments of the present invention will be described with respect to a side-by-side vehicle. However, it contemplated that aspects of the embodiments of the present invention could also be used on other types of wheeled vehicles, such as all-terrain vehicles (vehicles), and the like.

Figure 1:
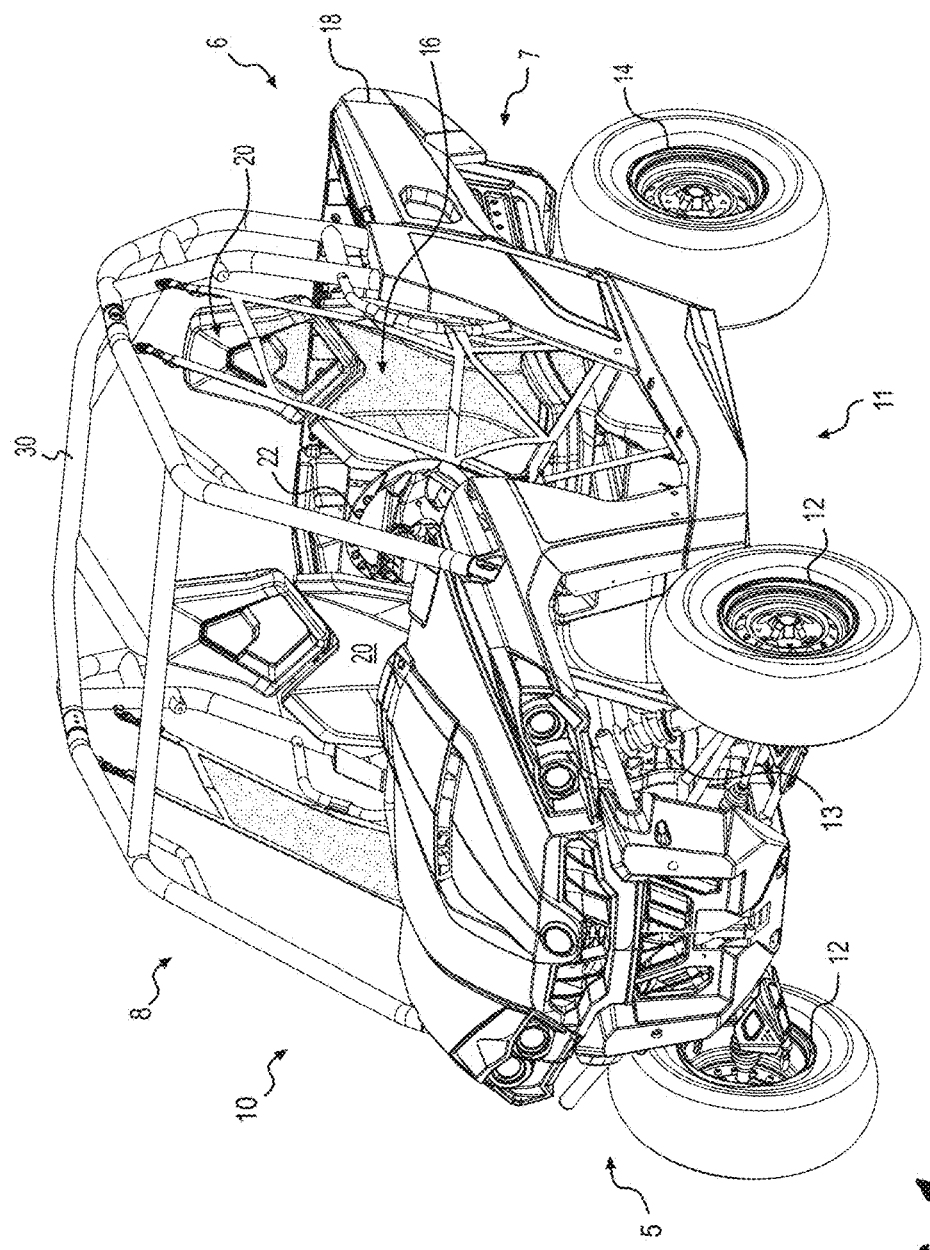
FIG. 1 is a perspective view taken from a front, left side of a side-by-side vehicle.

FIG. 1 illustrates a vehicle 10 having a front end 5 a rear end 6, a left lateral side 7 and a right lateral side 8. The vehicle 10 includes a frame 11 to which a vehicle body is mounted. A pair of front wheels 14 is suspended from the front portion of the frame 11 via front suspensions 13. A pair of rear wheels 14 is suspended from the rear portion of the frame 11 via rear suspensions (not shown). It is also contemplated that the vehicle 10 could have six or more wheels.

A cockpit area 16 is disposed in the middle portion of the frame 11. The cockpit area 22 comprises two seats 20 (left and right), mounted laterally beside each other to accommodate a driver and a passenger (riders) of the vehicle 10. The cockpit area 16 is open at the two lateral sides 7, 8 of the SSV 10, forming two lateral passages (left and right) through which the riders can ingress and egress the vehicle 10. A cargo box 18 is pivotally mounted to the frame 11 rearwardly of the seats 20. A roll cage 30, formed of an arrangement of metal tubes, is connected to the frame 11 and disposed above the cockpit area 16.

A motor 40 (shown schematically in FIG. 2) is mounted to the middle portion of frame 11. In the illustrated implementation of the SSV 10, the motor 40 is an internal combustion engine. It is, however, also contemplated that the motor 40 could be other than an internal combustion engine. For example, the motor 40 could be an electric motor, hybrid or other system used to propel the SSV 10. For simplicity, the motor 40 will be referred to hereinafter as the engine 40, but the technology is not to be limited to an internal combustion engine. The engine 40 is connected to a fuel injection system 76 (FIG. 12B) for receiving fuel therefrom. The engine 40 receives air from an air induction system (not shown) which includes a throttle valve 70 (FIG. 12B) for regulating the air flow to the engine 40. The throttle valve 70 is actuated by a throttle valve actuator 72. The engine 40 is also connected to an ignition system 74 for combustion of the fuel-air mixture. An engine control unit (ECU) 410 communicates with various systems and sensors connected to the engine 40 and other components connected thereto for controlling operation of the engine 40.

A steering assembly, including a steering wheel 22 is disposed in front of the left seat 20. It is contemplated that, the steering wheel 22 could be disposed in front of the right seat 20. The steering wheel 22 is operatively connected to the front wheels for steering the vehicle 10. It is contemplated that the steering wheel 22 could be operatively connected to the rear wheels 14 in addition to, or instead of, the front wheels 12, for steering the vehicle 10. It is contemplated that the vehicle 10 could have a handlebar instead of a steering wheel 22 for steering the vehicle 10.

The vehicle 10 has a throttle operator 24, in the form of a foot-actuated throttle pedal (not shown), disposed above the floor in front of the driver's seat 20. It is contemplated that the throttle operator 24 could be a thumb- or finger-actuated throttle lever, or the like.

Figure 12A:
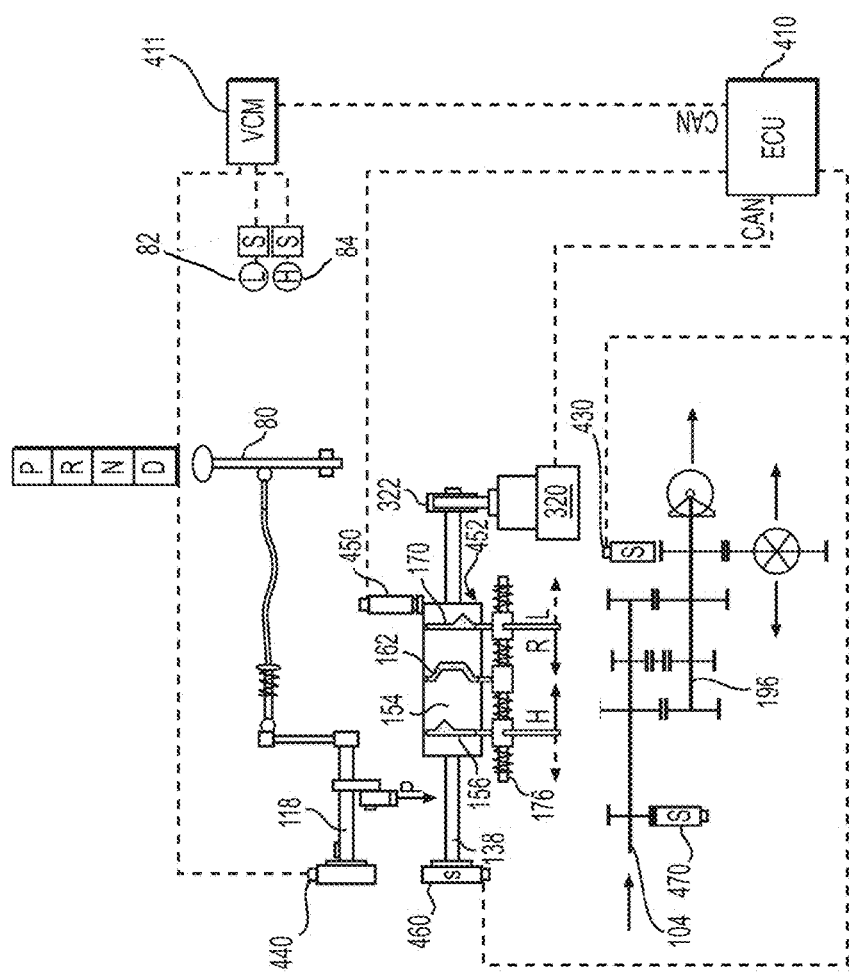
FIG. 12A is a schematic of a portion of the transmission and a control system for controlling operation of the transmission of the vehicle of FIG. 1.

A hand operated gear selector lever 80 (FIG. 12A) is mounted near the steering wheel 22. As shown in FIG. 12A, the gear selector lever 80 can be selectively placed in any one of the positions corresponding to park (P), reverse (R), neutral (N) and drive (D) gears to select the corresponding gear for the vehicle 10. It is contemplated that the sequence of gear selector positions could be different than as shown herein. Buttons 82 and 84 for low (L) and high (H) gears respectively are provided on the dashboard of the vehicle 10. It is contemplated that the buttons 82, 84 could be located elsewhere. The driver of the vehicle 10 uses the gear selector lever 80 and the buttons 82, 84 to select a gear driving configuration of a discrete gear transmission 100 as described in greater detail below. It is contemplated that buttons could also be provided for selecting one or more of the P, R, N and D gears instead of having corresponding positions of the gear selector lever 80 therefor. It is further contemplated that one or both of the H and L buttons could be omitted and the corresponding gear could instead be selected by placing the gear selector lever 80 in a corresponding H or L position. It is contemplated that the gear selector lever 80 could alternatively be a pedal, a finger actuated lever (or levers), a button, a knob, or any other suitable type of gear selector. In the illustrated implementation, each of the buttons 82, 84 is a push-button but it is contemplated that the button 82 and 84 could be in the form of a single switch or knob having a first position corresponding to L and a second position corresponding to H.

The vehicle 10 has other features and components such as headlights and fenders. As it is believed that these features and components would be readily recognized by one of ordinary skill in the art, further explanation and description of these components will not be provided herein.

Figure 2:
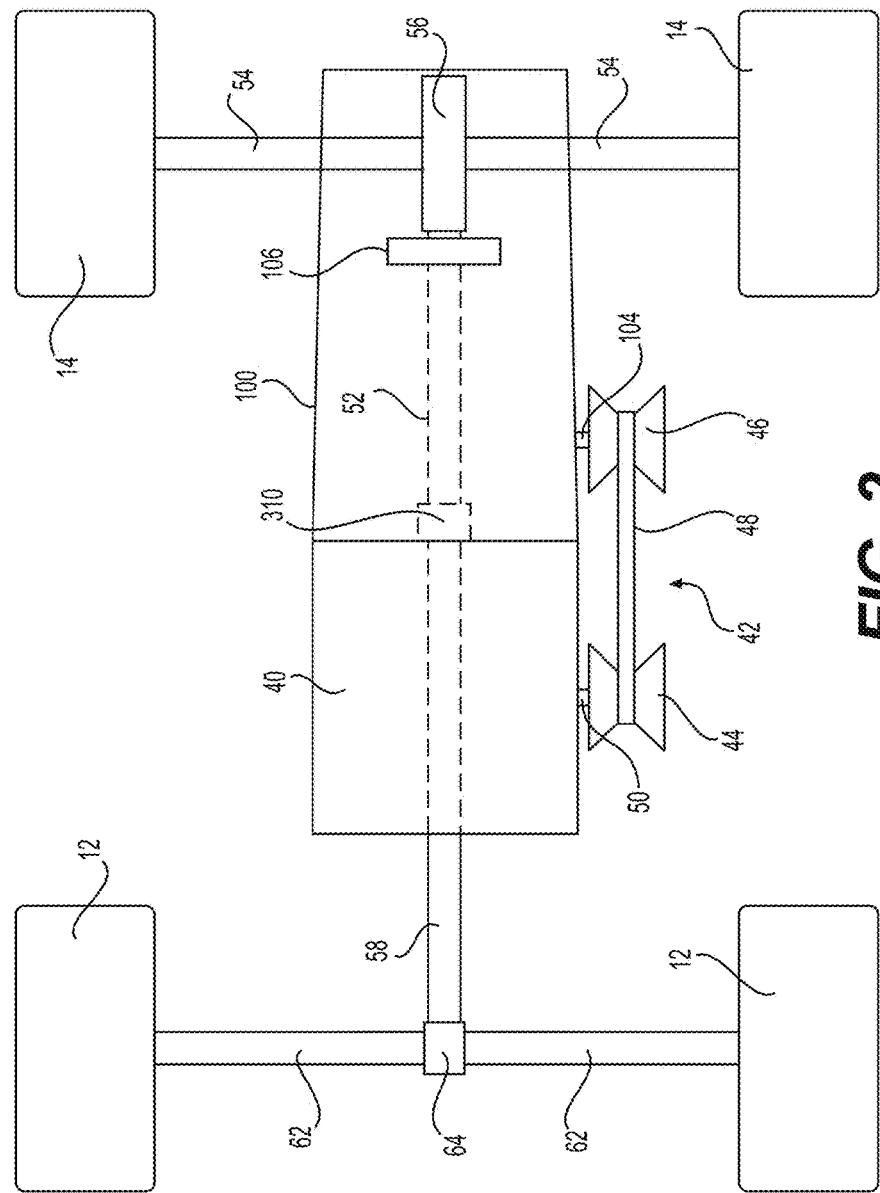
FIG. 2 is a schematic illustration of a top view of a drivetrain of the vehicle of FIG. 1.

Turning now to FIG. 2, a drivetrain of the vehicle 10 will be described. The engine 40 of the vehicle 10 transmits torque to the discrete gear transmission 100 via a continuously variable transmission (CVT) 42. For simplicity, the discrete gear transmission 100 will be referred to hereinafter as "transmission 100" while the continuously variable transmission 42 will be referred to hereinafter as CVT 42. The engine 40, the CVT 42, and the transmission 100 define the powertrain of the vehicle 10.

The CVT 42 includes a driving pulley 44, a driven pulley 46, and a belt 48. The driving pulley 44 is mounted on an output shaft 50 of the engine 40. The driven pulley 46 is mounted on an input shaft 104 of the transmission 100. The belt 48 transmits torque from the driving pulley 44 to the driven pulley 46. An output shaft 106 of the transmission 100 is operatively connected to the wheels 12, 14 as described below to transmit torque from the engine 40 to the wheels 12, 14. The output shaft 106 is connected to rear axles 54 via a rear differential 56. The rear axles 54 are connected to the rear wheels 14. The output shaft 106 is connected to a front shaft 52 extending generally longitudinally forwardly of the output shaft 106. The front shaft 52 is selectively connected to the front driveshaft 58 via a moveable sleeve 310. The moveable sleeve 310 is selectively actuated in response to the operator of the vehicle 10 making a selection between an all-wheel drive mode (i.e. with wheels 12 and 14 driven by the engine 40) and a two-wheel drive mode (i.e. with only the rear wheels 14 driven by the engine 40). The moveable sleeve 310 is operatively connected to a shift fork (not shown) and electric motor (not shown) for its selective actuation. The front driveshaft 58 passes through the engine 40. The front driveshaft 58 is connected to front axles 62 via a front differential 64. The front axles 64 are connected to the front wheels 12.

The engine 40 is an inline, three-cylinder, four-stroke, internal combustion engine. It is contemplated that the engine 40 could be a two-stroke internal combustion engine, a carbureted engine, or any other suitable engine or motor capable of propelling of the snowmobile 10. The engine output shaft 50 of the engine 40 rotates at an engine speed ES, and thereby rotates the driving pulley 44 at a rotational speed ES. It is contemplated that the driving pulley 44 could be mounted on a shaft other than the engine output shaft 50 that is operatively connected to the engine output shaft 50 to be driven thereby. It is contemplated that the rotational speed of the driving pulley could be different from that engine speed ES.

Each of the pulleys 44, 46 includes a movable sheave that can move axially relative to a fixed sheave to modify an effective diameter of the corresponding pulley 44, 46. The driving pulley 44 sheaves are biased away from each other so that when not rotating, the drive pulley sheaves are far apart and the belt 48 is disengaged from the driving pulley 44. The moveable sheave moves in response to changes in engine speed ES. The effective diameters of the pulleys 44, 46 are in inverse relationship. In the illustrated embodiment, the CVT 42 is a purely mechanical CVT 42, in which the effective diameter of the driving pulley 44 depends on the engine speed ES and torque applied to the wheels 12, 14. As the engine output shaft 50 and the driving pulley sheaves begin to rotate with increasing rotational speeds ES, the separation between the driving pulley sheaves decreases due to the action of a set of centrifugal weights pushing the moveable sheave towards the fixed sheave. At a certain engine speed ES, the driving pulley sheaves engage the belt 48 which in turn begins to rotate the driven pulley sheaves. The rotational speed ES of the engine output shaft 50 (and driving pulley sheaves 44) at which the driving pulley sheaves engage the belt 48 is referred to as the engagement speed $ES_{engage}$. It is also contemplated that the CVT 42 could be an assisted CVT having a hydraulic, pneumatic, or other system to control the effective diameter of the pulleys 42 or 44, and thus, the engagement speed $ES_{engage}$ of the CVT 42.

Turning now to FIGS. 3A to 8, the transmission 100 will be described in more detail.

Figure 3A:
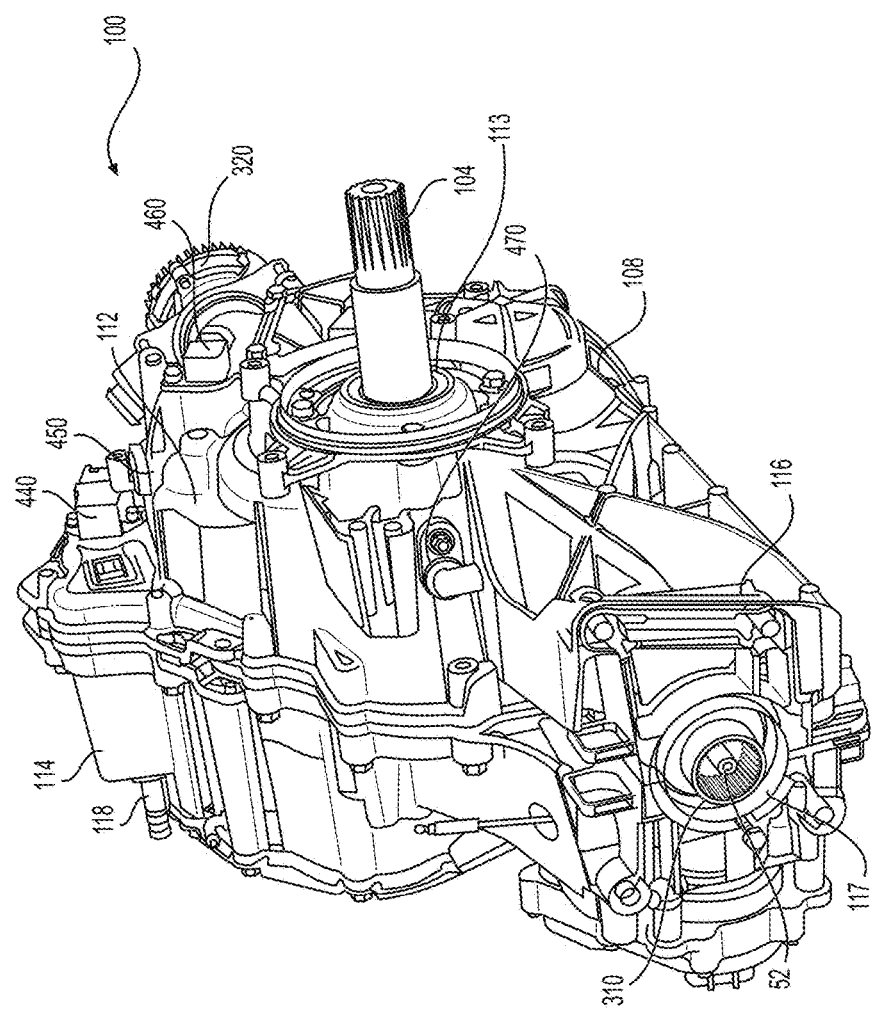
FIG. 3A is a perspective view, taken from a front, bottom and left side, of the transmission of FIG. 3A.
Figure 3B:
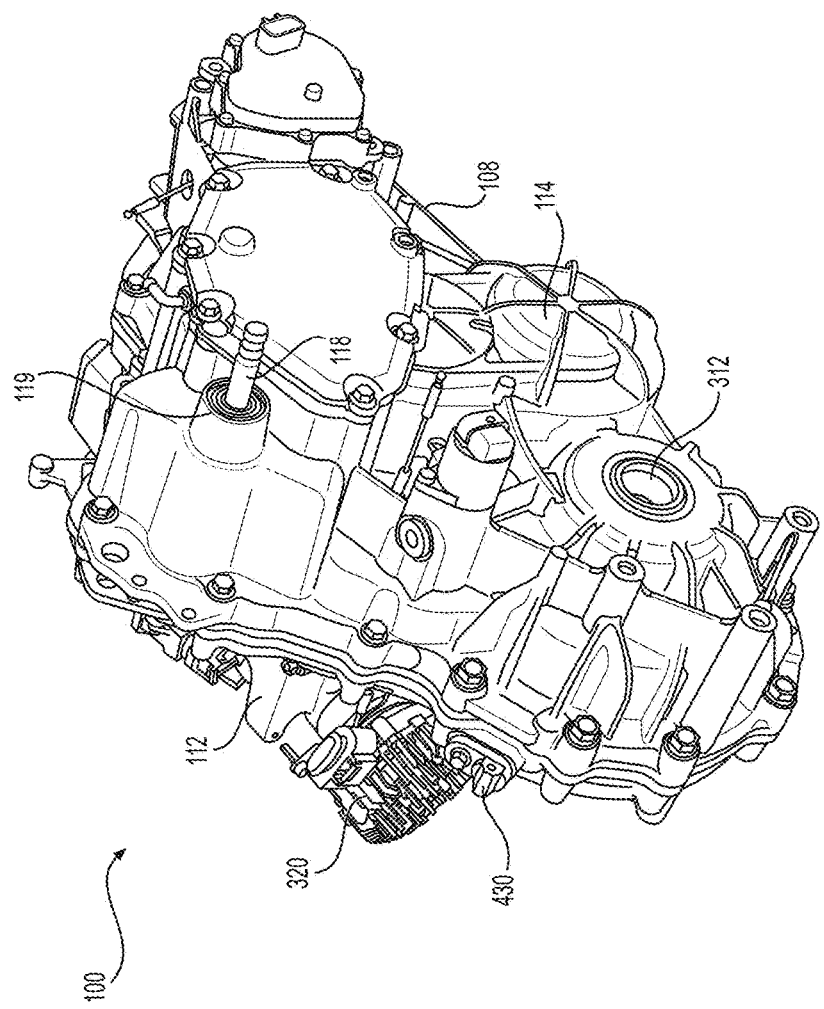
FIG. 3B is a perspective view, taken from a rear, top and right side, of the transmission of the vehicle of FIG. 1.

As seen in FIGS. 3A and 3B, the transmission 100 has a housing 108. The housing 108 is made of a left portion 112 and a right portion 114 fastened to each other by a plurality of bolts.

As can be seen in FIG. 3A, an opening 113 is defined by the left portion 112. The input shaft 104 of the transmission 100 extends through the opening 113 such that the driven pulley 46 can be mounted on the splined left end of the input shaft 104. A mounting flange 116 is formed at the front end of the housing 108 by the left and right covers 112, 114. The mounting flange 116 is used to mount the transmission 100 to the rear portion of the engine 40 disposed forwardly thereof. The mounting flange 116 includes an opening 117 is defined by the left and right covers 112. A front end of the shaft 52 is disposed in the opening 117. The front end of the shaft 52 is connected to an internally splined sleeve 310 (FIG. 8) used to operatively connect to the front driveshaft 58.

Figure 15:
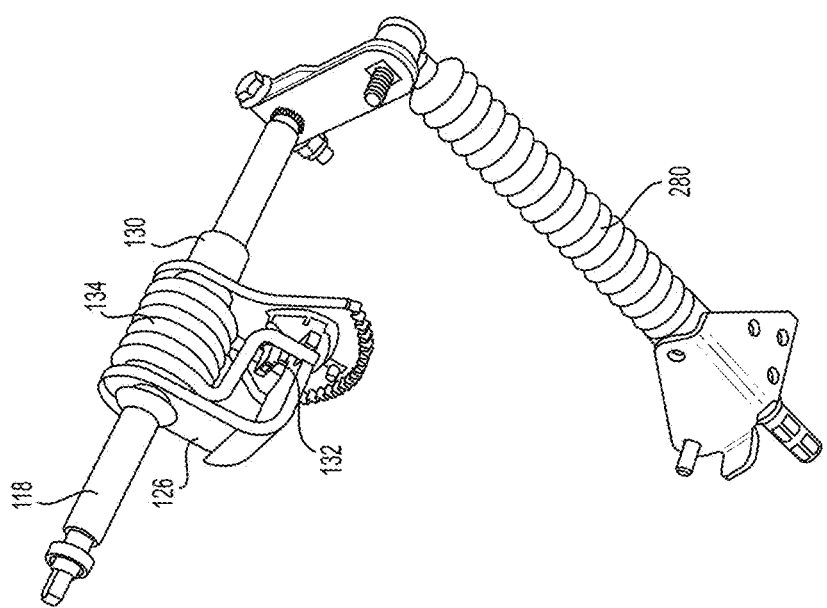
FIG. 15 is a perspective view, taken from a bottom, rear and left side, of a shift shaft of the transmission of FIG. 4 shown in isolation with a cable connected thereto.

As can be seen in FIG. 3B, an opening 119 is defined in the upper portion of the right portion 114. A shift shaft 118 of the transmission 100 extends rightwardly through the opening 119. The right end of the shift shaft 118 extends outside the housing 108, and is splined so as to be operatively connected to the gear selector lever 80 via a push pull cable 280 (FIG. 15). When the driver of the vehicle 10 moves the gear selector lever 80, the shift shaft 118 rotates. The right portion also defines a right opening 312 (FIG. 3B) facing rightwardly in the rear portion of the transmission housing 108. Although not seen, the left portion 112 also similarly defines a left opening. The rear differential 56 which includes a ring gear 306 (FIG. 5) is disposed inside the transmission housing 108 in the rear portion thereof between the left and right openings 312. The left end of the right rear axle 54 extends through the right opening 312 to operatively connect to the ring gear 306 via an internally splined sleeve of the differential 56. The right end of the left axle 54 similarly extends through the left opening (not shown) to operatively connect to the ring gear 306 via an internally splined sleeve of the differential 56.

With reference to FIGS. 4 to 8, the internal components of the transmission 100 will now be described.

Figure 4:
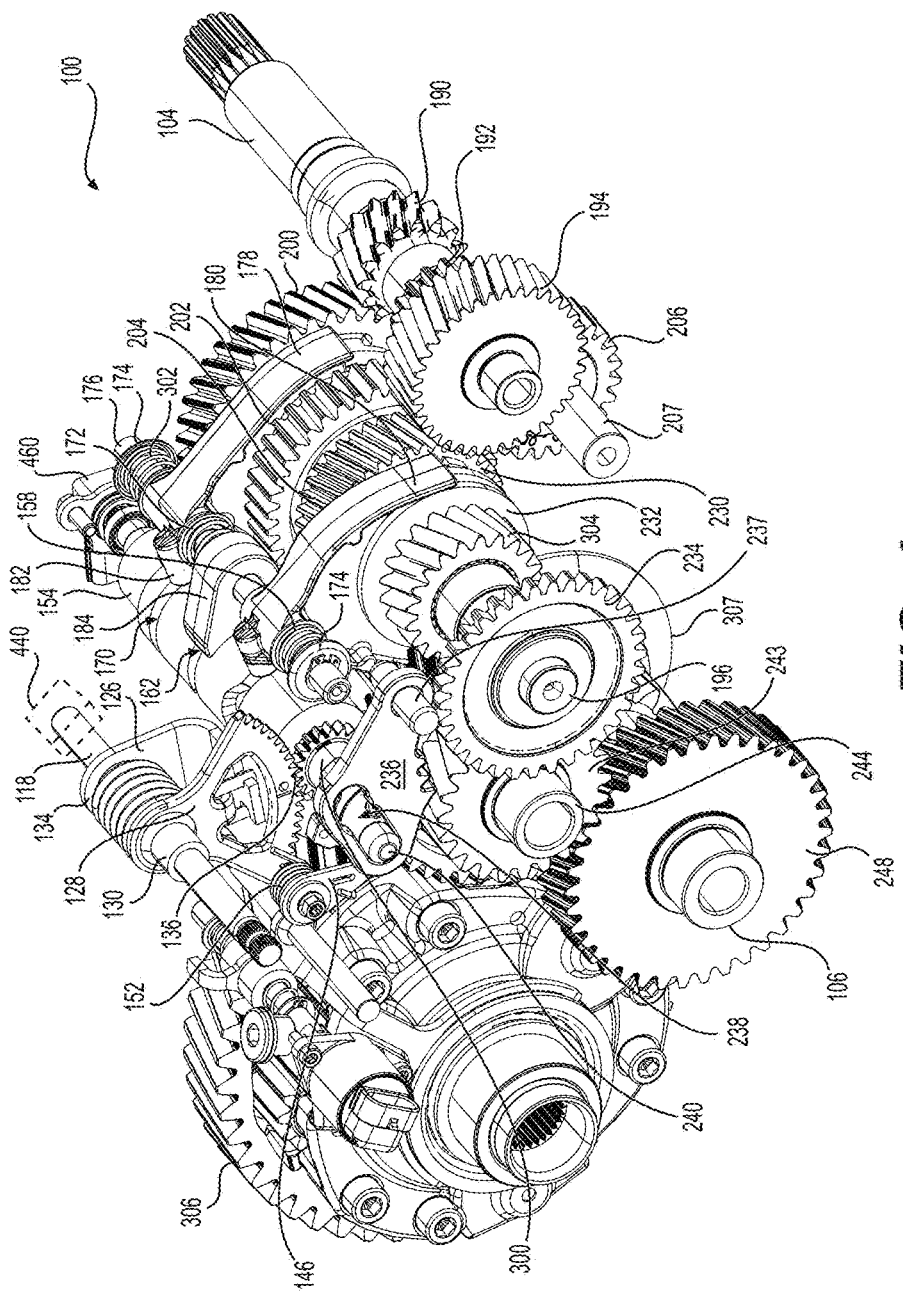
FIG. 4 is a perspective view, taken from a front, top and right side, of some of the internal components of the transmission of FIG. 3A.
Figure 6A:
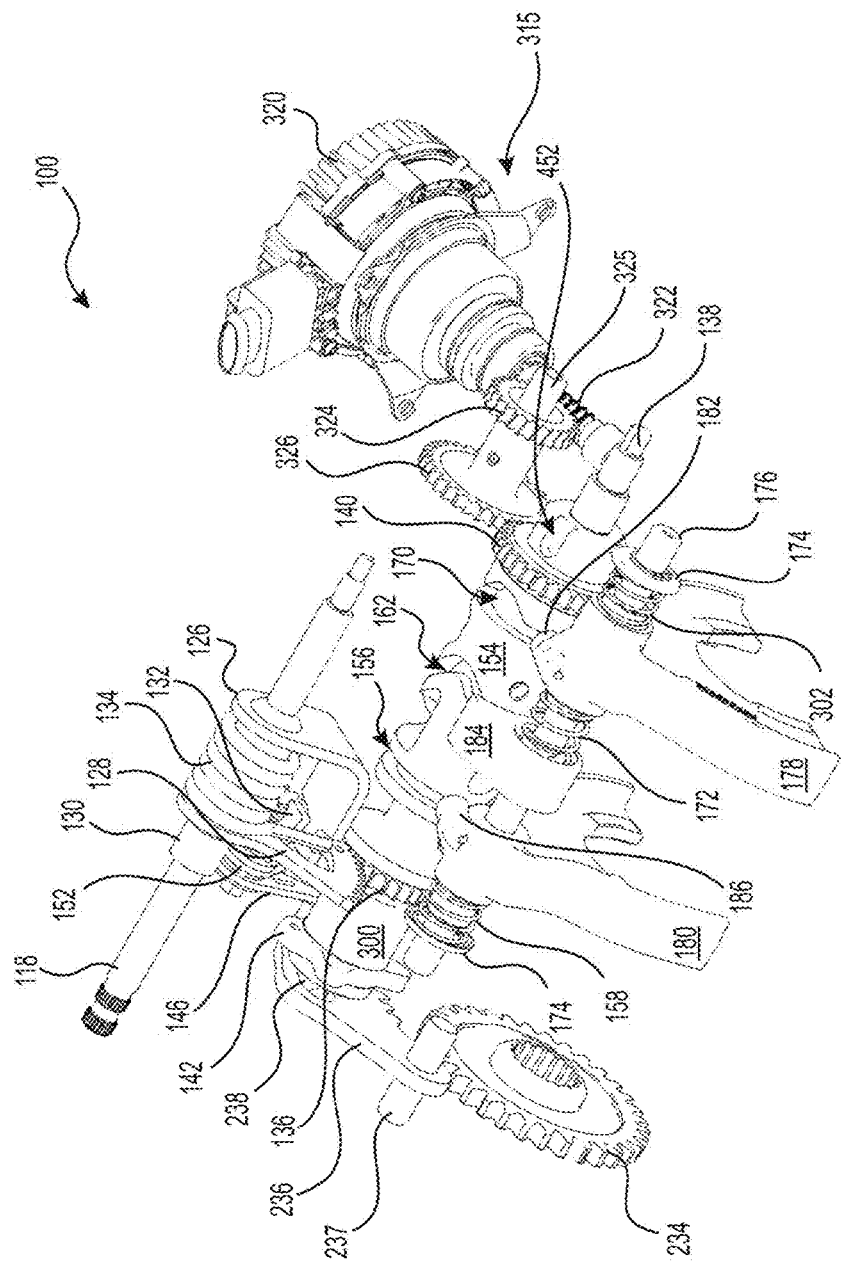
FIG. 6A is a perspective view, taken from a front, top and left side of a shift shaft, a parking lock assembly, a shift drum assembly, a shift drum actuator, and a fork rod assembly of the transmission of FIG. 3A.
Figure 6B:
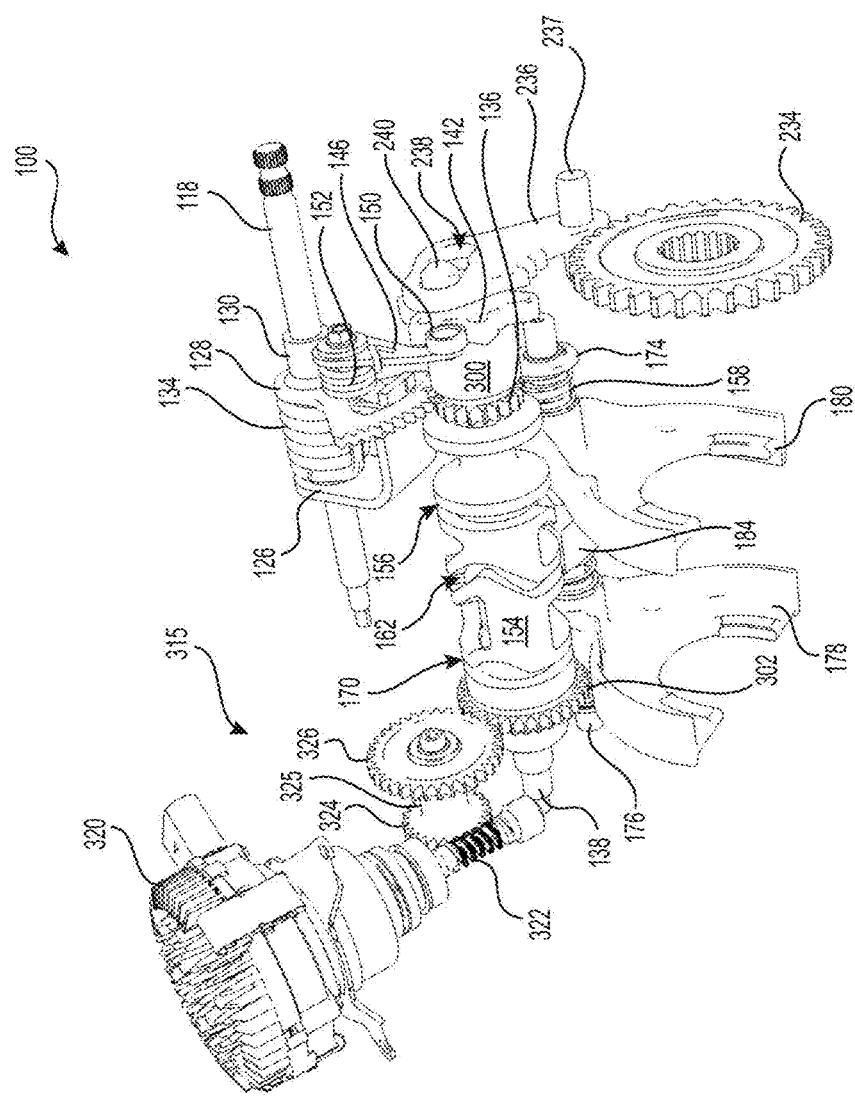
FIG. 6B is a perspective view, taken from a rear, bottom and right side of the shift shaft, the parking lock assembly, the shift drum assembly, the shift drum actuator and the fork rod assembly of the transmission of FIG. 6A.

As can be seen in FIGS. 4 6B, a shifting assembly 124 is mounted on the shift shaft 118. The left end of the shift shaft 118 has a position sensor 440 (shown schematically in FIG. 4) mounted thereon to sense the angular position of the shift shaft 118, and thereby determine the position of the gear selector lever 80. The rotational movement of the shift shaft 118 mechanically actuates a parking lock shaft 300 disposed parallel to the shift shaft 118. As best seen in FIGS. 4, 6A and 6B, the shift shaft 118 has mounted thereon a lever 126 and a segment gear 128. The lever 126 has a radial portion extending from the shift shaft 118 in a radial direction thereof and an axial portion extending from the radial portion in an axial direction of the shift shaft 118. A pair of grooves is formed at the end of the axial portion of the lever 126. The lever 126 rotates with the shift shaft 118. The segment gear 128 has a sleeve portion 130 that is rotatably mounted on the shift shaft 118. The segment gear 128 has a seat 132 projecting, in an axial direction of the shift shaft 118, from an edge of an opening in the segment gear 128. A torsion spring 134 is installed onto the sleeve portion 130 of the segment gear 128. The ends of the torsion spring 134 are bent so as to be received in the pair of grooves of the lever 126 and to abut either sides of the seat 132 as shown. A more detailed description of a shifting assembly of the type of the shifting assembly 124 is provided in U.S. Pat. No. 7,617,904, issued Nov. 17, 2009, and in International Patent Application Publication No. WO2011/139264 A2, published on Nov. 10, 2011, the entirety of which is incorporated herein by reference.

The rotational movement of the shift shaft 118 imparted by the gear selector 80 is transferred to the segment gear 128 via the lever 126 and the torsion spring 134. The rotational movement of the shift shaft 118 is transferred to a parking lock shaft 300 of a parking lock assembly disposed parallel to the shift shaft 118.

The parking lock assembly will now be described with reference to FIGS. 4 to 6C and 7. As best seen in FIGS. 6A and 6B, a parking lock gear 136 is mounted on the parking lock shaft 300 to rotate therewith. The segment gear 128 engages and drives the parking lock gear 136, and thereby the parking lock shaft 300. An indexing wheel 142 is also mounted on the parking lock shaft 300 to rotate therewith. The indexing wheel 142 defines five recesses 144, with each gear selector position P, R, N, D corresponding to one of the recesses of the indexing wheel 142. It is contemplated that the indexing wheel 142 could have four recesses corresponding to the four positions P, R, N, D of the gear selector 80. It is contemplated that the indexing wheel 142 could not have the recesses corresponding to the gear selector position R, N, D. An indexing lever 146 is rotatably disposed on a shaft 148 disposed parallel to the parking lock shaft 300. A roller 150 is provided at one end of the indexing lever 146. A spring 152 biases the end of the indexing lever 146 toward the indexing wheel 142 such that the roller 150 is in contact with the indexing wheel 142. The indexing wheel 142 and indexing lever 146 provide some resistance to rotation of the parking lock shaft 300 to and from the park configuration of the transmission 100 as will be described below. A parking lock lever 236 is pivotally mounted on a pin 237 which is mounted to the transmission housing 108. The parking lock lever 236 has an opening 238 defined therein. An eccentric 240 is connected to an end of the parking lock shaft 300. The eccentric 240 is received inside the opening 238 of the parking lock lever 236.

As can be seen in FIGS. 4 and 7, the parking lock lever 236 selectively engages a countershaft gear 234 mounted on a right end of a countershaft 196. The countershaft gear 234 is rotationally fixed to the countershaft 196. When the parking lock lever 236 engages the countershaft gear 234, the countershaft gear 234 and therefore, the countershaft 196 are prevented from rotating. As the parking lock shaft 300 is rotated, the eccentric 240 moves the parking lock lever 236 from the position where the parking lock lever 236 engages the countershaft gear 234 to a plurality of positions where the parking lock lever 236 is disengaged from the countershaft gear 234. The parking lock lever 236 is mounted pivotally on the pin 237 so as to engage the countershaft gear 234 when the gear selector 80 is disposed in the parking gear position P. The countershaft gear 234 is disengaged from the parking lock lever 236 when the gear selector 80 is disposed in any position other than the parking gear position P.

Figure 5:
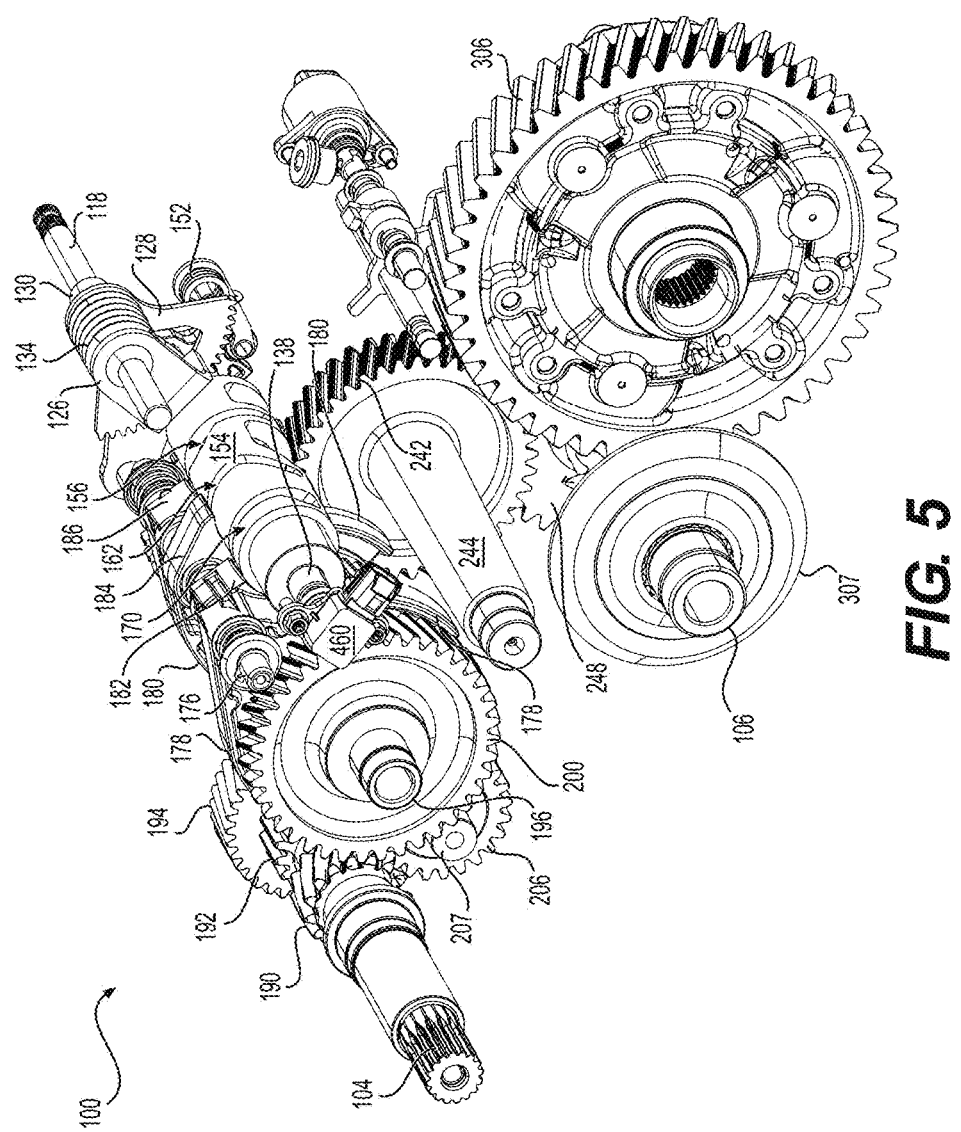
FIG. 5 is a perspective view, taken from a rear, top and left side of some of the internal components of the transmission of FIG. 3A.
Figure 6C:
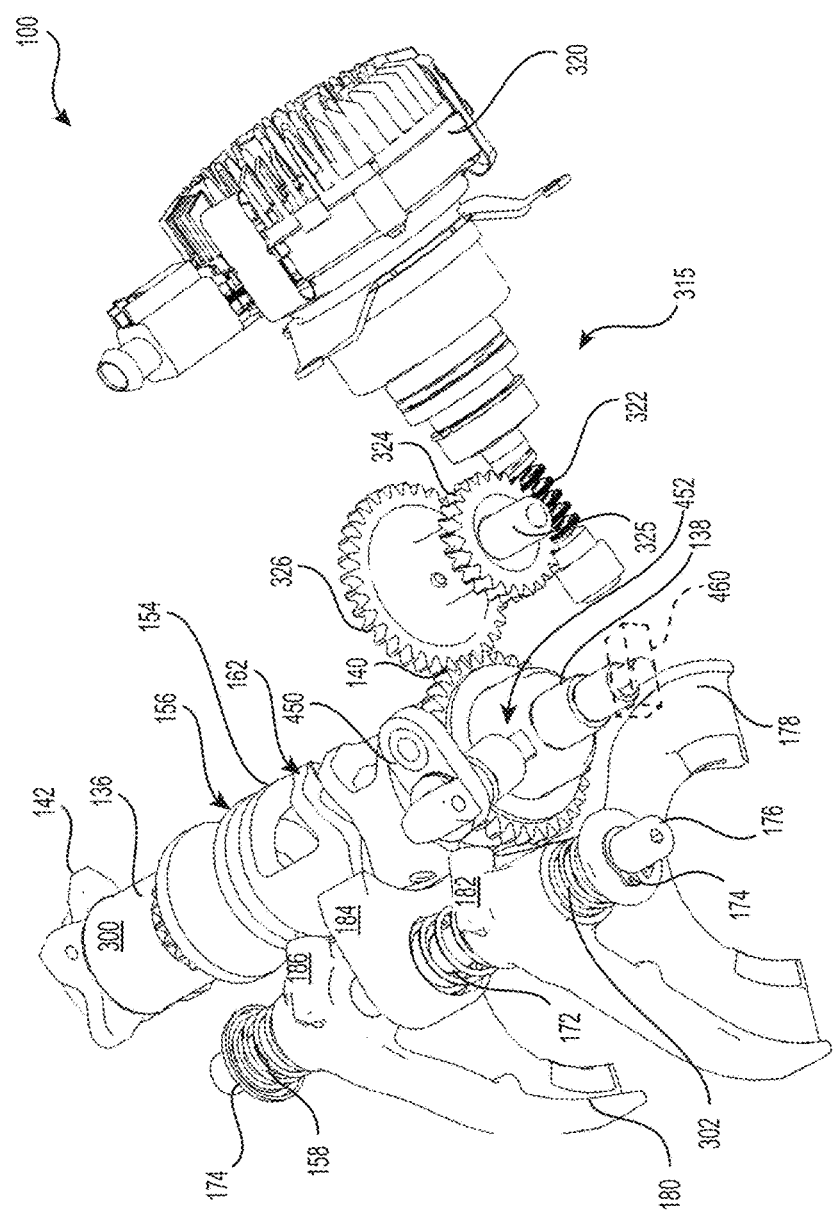
FIG. 6C is a perspective view, taken from a top and left side, of the parking lock assembly, the shift drum assembly, the shift drum actuator and the fork rod assembly of the transmission of FIG. 6A and also showing two shift drum position sensors.
Figure 6D:
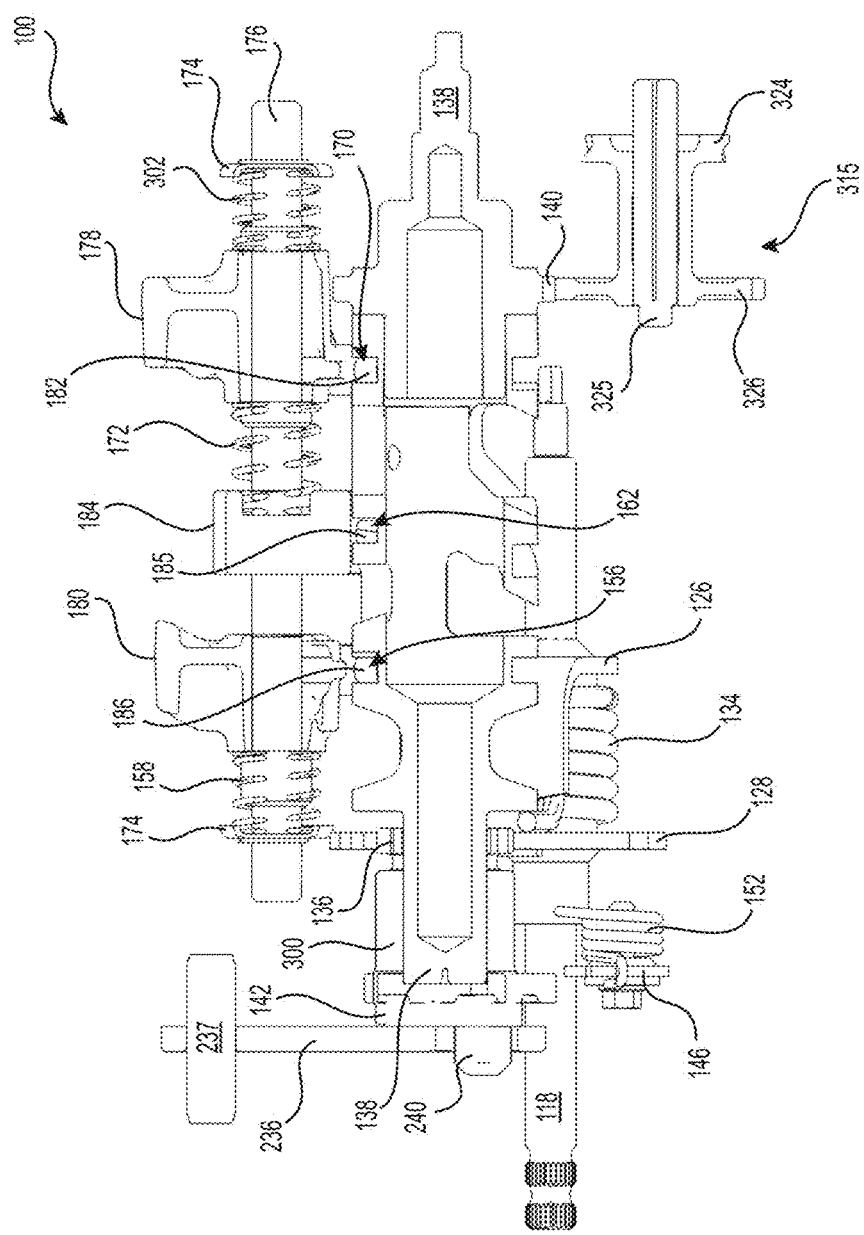
FIG. 6D is a cross-sectional view of the shift shaft, the parking lock assembly, the shift drum assembly, and the fork rod assembly of the transmission of FIG. 6A.

The transmission 100 includes a shift drum assembly which will now be described with respect to FIGS. 4 to 6D and 7. As best seen in FIG. 5 to 6C, a shift drum shaft 138 is disposed coaxially with the parking lock shaft 300 and on a left side thereof. In the illustrated implementation of FIGS. 4 to 6D, the shift drum shaft 138 is rotatable independently of the parking lock shaft 300. The rotation of the shift drum shaft 138 causes the transmission 100 to be placed in a configuration corresponding to one of the reverse R, neutral N, low L and high H gears. The transmission 100 is an automated transmission in which the shift drum shaft 138 is rotated by a shift drum actuation assembly described below for placing the transmission in one of the reverse R, neutral N, low L and high H gears.

As best seen in FIGS. 4 to 6D, a shift drum 154 is mounted on the shift drum shaft 138 to rotate therewith. The shift drum 154 defines a right groove 156, a middle groove 162 and a left groove 170. The middle groove 162 is formed continuously with the left groove 170 and the right groove 156. The grooves 156, 162, 170 are shaped to effect the desired shifting sequence of the vehicle transmission 100 as described in greater detail below. In the illustrated implementation of the transmission 100, each of the grooves 156, 162, 170 is continuous and the shift drum 154 is therefore rotatable by 360°. It is however contemplated that grooves 156, 162, 170 could not be continuous and the shift drum 154 could not be rotatable by 360°.

With reference to FIG. 6A to 6D, a left end of the shift drum shaft 138 has mounted thereon a shift drum gear 140. (The shift drum gear 140 had been removed in FIGS. 4 and 5 for clarity). The shift drum gear 140 is used to rotate the shift drum 154. The shift drum shaft gear 140 is rotated by a shift drum actuation assembly 315 including a shift drum actuator in the form of an electric motor 320. The shift drum actuation assembly 315 also includes, a worm gear 322, a shaft 325 and gears 324, 326. The electric motor 320 advances and retracts the worm gear 322 which engages the smaller gear 324 mounted on the shaft 325 disposed parallel to the shift drum shaft 138 to rotate therewith. The shaft 325 also has the larger gear 326 mounted thereon to rotate therewith. The larger gear 326 engages the shift drum shaft gear 140 to rotate the shift drum 154 mounted on the shift drum shaft 138. Thus, when the worm gear 322 advances forwardly, the shift drum 154 rotates in one direction, and the shift drum 154 rotates in the opposite direction when the worm gear 322 retracts rearwardly. It is contemplated that the shift drum actuation assembly 315 could be configured differently than as shown herein.

Figures 9, 10:
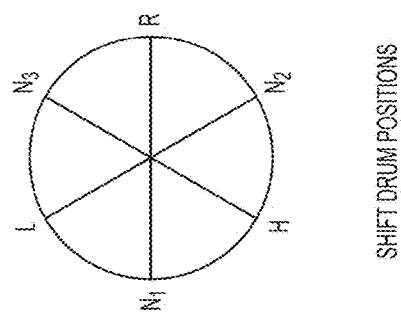
FIG. 9 is a schematic illustration of the angular positions of the shift drum of FIG. 6A.
FIG. 10 is a table showing the angular positions of FIG. 9.

With reference to FIGS. 9 to 11, the shift drum 154 has six different angular positions. Listed sequentially, the six positions of the shift drum 154 are: a first neutral gear position $N_1$, a high gear position H, a second neutral gear position $N_2$, a reverse gear position R, a third neutral gear position $N_3$ and a low gear position L. The six shift drum positions $N_1$, H, $N_2$, R, $N_3$ and L correspond respectively to a neutral gear driving configuration, high gear driving configuration, neutral gear driving configuration, reverse gear driving configuration, neutral gear driving configuration and low gear driving configuration of the transmission 100. Each of the three neutral gear positions $N_1$, $N_2$, and $N_3$ of the shift drum 154 correspond to the same neutral gear driving configuration of the transmission 100. A current angular position $PI_{actual}$ of the shift drum 154 is determined using sensors 450, 460 as described below.

As can be seen in FIGS. 6A and 6C, in the illustrated implementation, an axially and radially extending notch 452 is defined on the outer curved surface of the shift drum 154. The notch 452 is aligned with the first neutral shift gear position N1 and serves as reference for the angular position. A shift drum reference position sensor 450 (FIG. 6C) is coupled to the shift drum 154 to sense the position of the notch 452. In the illustrated implementation, the shift drum reference position sensor 450 is a Hall sensor. The notch 452 is detected by the Hall sensor 450 to perform initial calibration of the angular positions when the vehicle 10 is first started up. A potentiometer 460 (shown schematically in FIG. 6C) is also coupled to the shift drum 154 to detect the current angular position $PI_{actual}$ of the shift drum 154 relative to the reference position $N_1$.

An angular position signal indicative of the current angular position $PI_{actual}$ of the shift drum 154 is sent to the electric motor 320. The shift drum 154 is rotated from a current position to a desired position $PI_{target}$ by the electric motor 320, based on the position of the gear selector 80 and the buttons 82, 84 using the Position Change Request Table (FIG. 11) and a method 700 described below with reference to FIGS. 11 to 14. The electric motor 320 is equipped with a position sensor (not shown) that also detects the angular position of the shift drum 154 and a controller system that automatically chooses the optimal direction of rotation for changing from one gear position to another. The position sensor of the electric motor provides a redundant signal indicative of the shift drum position $PI_{actual}$ and is provided for additional safety but it is contemplated that only one of the sensors 460 or 320 could be provided.

It is contemplated that the potentiometer 460 could be omitted and the position sensor of the electric motor 320 could be used to obtain the current angular position of the shift drum 154. It is further contemplated that the notch 452 and the shift drum reference position sensor 450 could be omitted. It is contemplated that in an implementation of the shift drum 154 in which the grooves 156, 162, 170 are not continuous (i.e. shift drum 154 is not rotatable by 360°), an end of one of the grooves 156, 162, 170 could be used as a reference position for the shift drum. It is also contemplated that the position sensor of the electric motor 320 could be configured so as to be able to determine a current position of the shift drum 154 with respect to a reference position (other than the notch 452) that is internal to the electric motor 320. It is further contemplated that the position sensor of the electric motor 320 could be configured to store a current position of the shift drum 154 even after the electric motor 320 is turned off and to recall the stored current position when the electric motor 320 is subsequently started up.

Figure 6E:
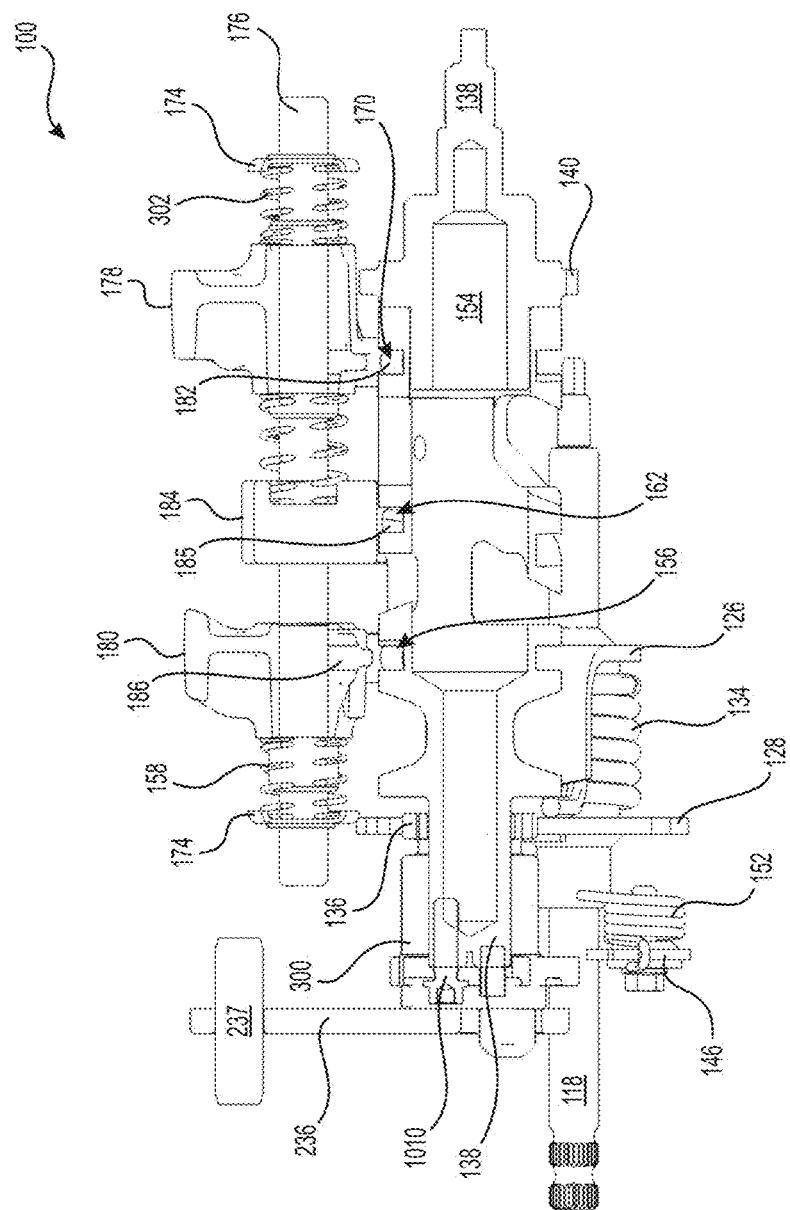
FIG. 6E is a cross-sectional view of the shift shaft, the parking lock assembly, the shift drum assembly, and the fork rod assembly of FIG. 6A shown in a configuration as in a manual transmission where the parking lock shaft rotates with the shift drum shaft and both are rotated by the shift shaft.

The components of the transmission 100 described above can also be used to form a manually actuated version of the transmission 1000. A parking lock assembly and a shift drum assembly of a manual transmission 1000 is shown in FIG. 6E. The manual transmission 1000 is formed using the components of the transmission 100 shown in FIGS. 4 to 6D, 7 and 8. Corresponding components of the transmissions 100 and 1000 are labeled using the same reference labels and will only be discussed herein with respect to the differences between the transmissions 100 and 1000. The shift shaft position sensor 440, the shift drum reference position sensor 450, the shift drum potentiometer 460, and the shift drum actuation assembly 315 including the electric motor 320, worm gear 322, gears 324, 326 and the shaft 325 having the gears 324, 326 mounted thereon are omitted in the manual transmission 1000. In the manual transmission of FIG. 6D, the parking lock shaft 300 is fastened to the shift drum shaft 138 by a bolt 1010 to rotate therewith, and both of the parking lock shaft 300 and the shift drum shaft 138 are rotated by rotation of the shift shaft 118. The manual transmission 1000 is connected to a gear selector (not shown) that has positions P, R, N, H, L (corresponding to park, reverse, neutral, high and low gears) and the gear selection buttons 84, 82 for H and L respectively are omitted in the manual transmission 1000. The shift shaft 118 which rotates in response to the actuation of the gear selector (not shown) of the manual transmission 1000 is thus rotatable to each of five positions corresponding to P, R, N, H, L. The five recesses of the indexing wheel 142 correspond sequentially to P, R, N H, L. In the manual transmission 1000, the shift drum 154 also has five angular positions corresponding to the P, R, N, H, L. The transmissions 100 and 1000 can thus be constructed using the same components thereby allowing efficiency in manufacture and savings in cost.

Turning back now to the transmission 100, a fork rod assembly of the transmission 100 will now be described. With reference to FIGS. 6A to 6D, a fork rod 176 is disposed parallel to the shift drum shaft 138 and forwardly thereof. Two shift forks 178, 180 and a shift arm 184 are slidably disposed on the fork rod 176. The shift fork 178 is disposed on a left side of the fork rod 176, the shift fork 180 is disposed on a right side of the fork rod 176, and the shift arm 184 is disposed therebetween. The left shift fork 178 has a pin 182 projecting rearwardly therefrom and being received in the left groove 170 of the shift drum 154 such that as the shift drum 154 rotates, the pin 182 follows the groove 170 and causes the left shift fork 178 to slide along the fork rod 176. The shift arm 184 has a pin 185 (FIG. 6D) projecting rearwardly therefrom and being received in the middle groove 162 of the shift drum 154. The right shift fork 180 has a pin 186 received in the right groove 156 of the shift drum 154 such that as the shift drum 154 rotates the pin 186 follows the right groove 156 and causes the right shift fork 180 to slide along the fork rod 176.

The fork rod 176 also has mounted thereon coil springs 158, 172 and 302, a left stopper ring 174 and a right stopper ring 174. It is contemplated that other types of springs could be used instead of any of the coils springs 158, 172, and 302. The right and left stopper rings are respectively disposed near the right and left ends of the fork rod 176. The coil spring 158 is disposed between the right stopper ring 174 and the right shift fork 180. The coil spring 158 biases the right shift fork 180 away from the right end of the fork rod 176 toward the shift arm 184. The coil spring 172 is disposed between the shift arm 184 and the left shift fork 178. The coil spring 172 biases the left shift fork 178 away from shift arm 184 toward the left stopper ring 174. The coil spring 302 is disposed between the left stopper ring 174 and the left shift fork 178, and biases the left shift fork 178 away from the left stopper ring 174 toward the shift arm 184.

With reference now to FIGS. 4 and 7, the input shaft 104 is parallel to the fork rod 176. The input shaft 104 is rotatably supported inside the housing 108 by a right bearing (not shown) mounted on the input shaft 104 near the right end thereof and a left bearing (not shown) mounted on the input shaft 104 between the right bearing and the left end of the input shaft 104. Three input shaft gears 190, 192, 194 are mounted on the input shaft 104 and rotate therewith. The input shaft gears 190, 192, 194 are disposed between the left and right bearings. As can be seen, the input shaft gears 190, 192, 194 have different diameters, with left input shaft gear 190 having the smallest diameter and right input shaft gear 194 having the largest diameter. It is contemplated that the number and configuration of input shaft gears could be different than as shown herein.

As seen in FIGS. 4 and 7, the countershaft 196 is disposed parallel to the input shaft 104. The countershaft 196 is rotatably supported by the housing 108 by a bearing (not shown) mounted near each end of the countershaft 196. Three countershaft gears 200, 202, 204 are rotatably mounted on the countershaft 196 so as to be rotatable independently of the countershaft 196 and axially slidable therealong. For example, in the park and neutral gear positions described below, as long as the input shaft 104 is rotating, the countershaft gears 200, 202, 204 rotate even though the transmission shaft 196 is not rotating. The countershaft gear 202 is disposed between the countershaft gears 200 and 204, spaced from the countershaft gear 200 and is disposed next to the countershaft gear 204. Another countershaft gear 304 is disposed on a right side of the countershaft gears 200, 202, and 204. The countershaft gear 304 has an internally splined hub (not shown) and is mounted on a splined portion 217 (FIG. 16) of the countershaft 196 so as to be rotationally fixed thereto. The countershaft gear 304 and the countershaft 196 selectively rotate with one (or none) of the countershaft gears 200, 202 and 204 based on the axial position of the shift forks 178, 180 on the fork rod 176 as discussed below.

Figure 18:
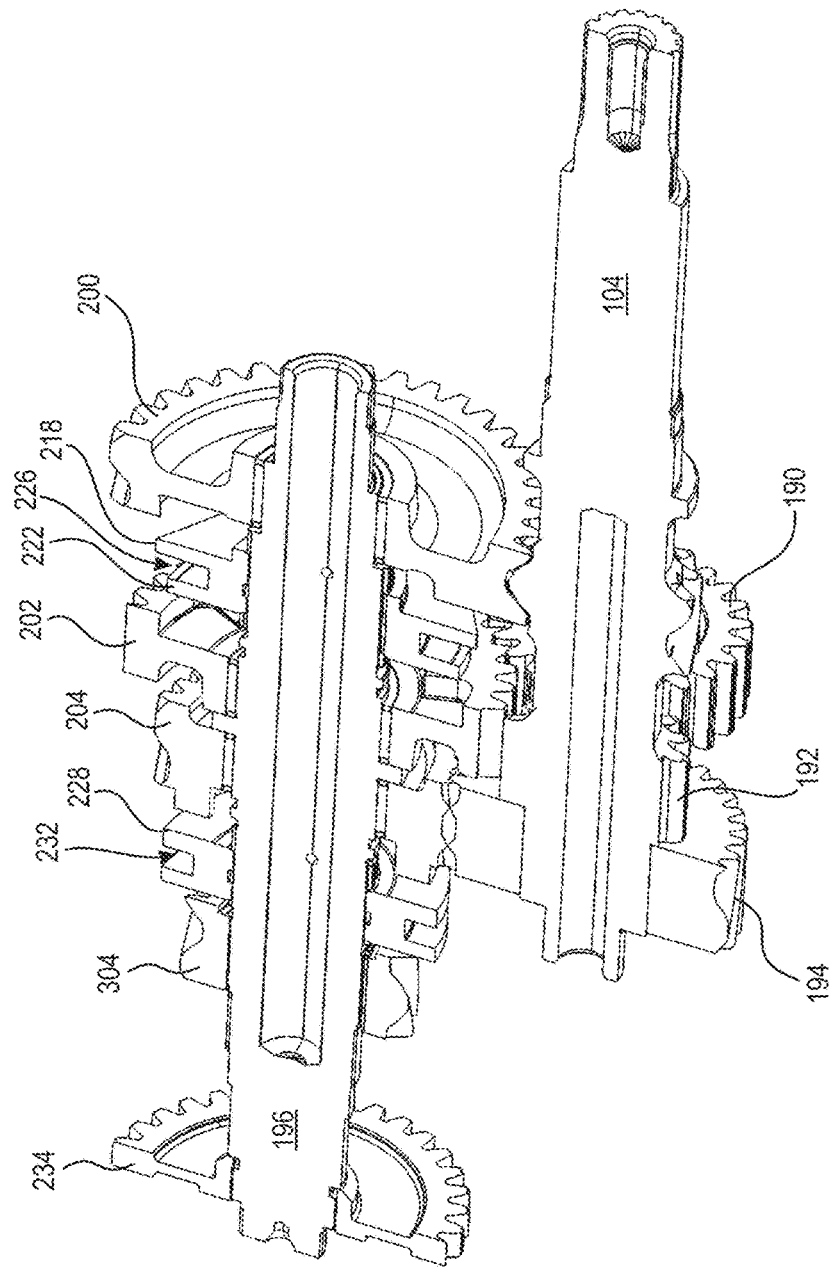
FIG. 18 is a perspective cross-sectional view taken from a front, top and right side, of the input shaft and the countershaft of the transmission of FIG. 4 with the respective gears mounted thereon and with the section being taken along a plane containing a central axis of the input shaft and the countershaft.

As best seen in FIGS. 7 and 18, the countershaft gear 200 engages and is driven by the input shaft gear 190. The countershaft gear 204 engages and is driven by the input shaft gear 194. The countershaft gear 202 engages and is driven by the idler gear 206 (FIG. 7) which is disposed on a shaft 207 (FIG. 7) disposed parallel to the input shaft 104 and the countershaft 196. The idler gear 206 engages and is driven by the input gear 192. Therefore, the countershaft gear 202 rotates in a direction opposite from the countershaft gears 200, 204. A diameter of the countershaft gear 200 is larger than the diameter of the countershaft gear 204. Therefore the gear ratio of the gears 190 and 200 versus the gear ratio of the gears 194 and 204 is such that the speed of rotation of the countershaft gear 204 is greater than the speed of rotation of the countershaft gear 200. However, as mentioned above, the number and configuration of the gears on the input shaft 104 and accordingly the countershaft 196 could be different than as shown herein.

Figure 17A:
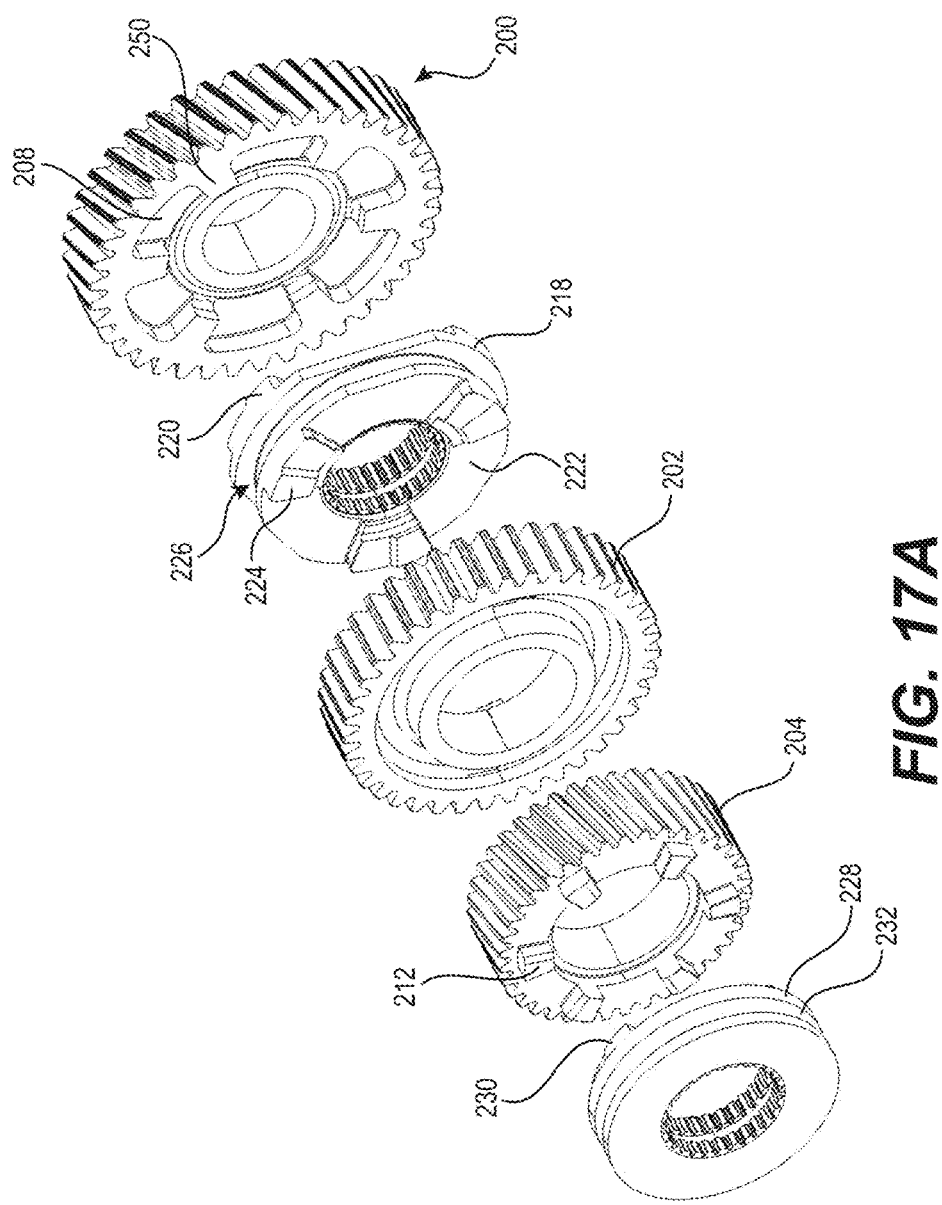
FIG. 17A is an exploded perspective view, taken from a front, top and right side, of the countershaft gears of the transmission of FIG. 4 with the countershaft being removed for clarity.
Figure 17B:
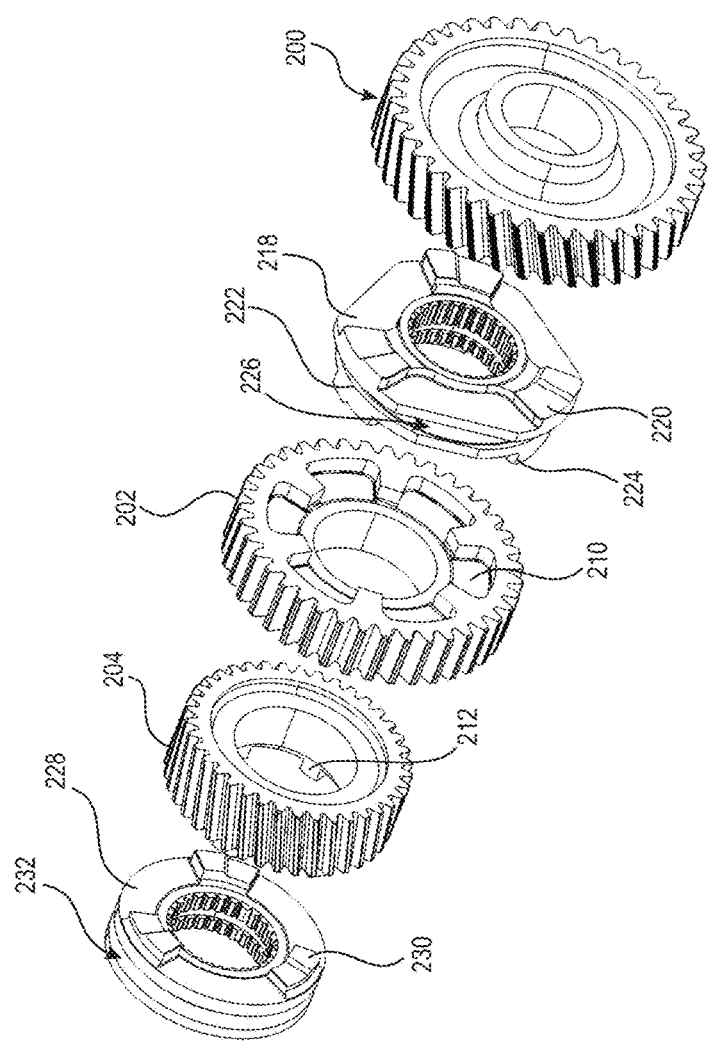
FIG. 17B is an exploded perspective view, taken from a front, top and left side, of the countershaft gears of FIG. 17A.

Referring to FIGS. 17A and 17B, the countershaft gear 200 has a set of openings 208, the countershaft gear 202 has a set of openings 210, and the countershaft gear 204 has a set of teeth 212. It is contemplated that the teeth 212 could be openings. The openings 208, 210, 212 are arranged in a circular pattern radially inwardly of an outer periphery of the respective countershaft gears 200, 202, 204.

With reference to FIGS. 16 to 18, the countershaft 196 has splined portions 214, 216, 217. The splined portion 214 is disposed between the countershaft gears 200 and 202. The splined portion 216 is disposed next to the countershaft gear 204. As mentioned above, the countershaft gear 304 is disposed around the splined portion 217 so as to be rotatably fixed to the countershaft 196. A shifting sleeve 218 mounted on the countershaft 196 between the transmission gears 200 and 202 engages the splined portion 214 so as to be rotatably fixed to the countershaft 196 and axially movable with respect to the countershaft 196. The shifting sleeve 218 has set of teeth 220 selectively engaging the set of openings 208 of the countershaft gear 200. A shifting sleeve 222 is disposed between the shifting sleeve 218 and the countershaft gear 202. The shifting sleeve 222 engages the splined portion 214 so as to be rotatably fixed to the countershaft 196 and axially movable with respect to the countershaft 196. The shifting sleeve 222 has set of teeth 224 for selectively engaging the set of openings 210 of the countershaft gear 202. The shifting sleeves 218 and 222 are integrally formed, however it is contemplated that the shifting sleeves 218 and 222 could be separate parts. The left shift fork 178 is received in a groove 226 formed between the shifting sleeves 218 and 222. A shifting sleeve 228 is disposed on the splined portion 216 such that the countershaft gears 202, 204 are disposed between the shifting sleeve 222 and 228. The shifting sleeve 228 engages the splined portion 216 so as to be rotatably fixed to the countershaft 196 and axially movable with respect to the countershaft 196. The shifting sleeve 228 has a set of teeth 230 for selectively engaging the set of teeth 212 of the countershaft gear 204. The shifting sleeve 228 is disposed between the countershaft gears 204 and 304. The right shift fork 180 is received in a groove 232 formed in a flange connected to the shifting sleeve 228 on a side opposite to the teeth 230.

With reference to FIGS. 4 and 6A to 6D and 7, when the shift drum 154 rotates, the shift forks 178, 180 disposed in the grooves 156 and 170 slide axially along the fork rod 176. The grooves 156, 162, 170 are continuous, hence the shift drum 154 can rotate in both directions (clockwise/counterclockwise) from any one position to any other position. In an implementation of the shift drum 154 in which the grooves 156, 162, 170 are not continuous, the shift drum 154 could only be rotated from one position to another position in one of the clockwise and counter-clockwise directions. By sliding the shift forks 178, 180 along the fork rod 176, the countershaft gears 200, 202, 204 can be engaged by their corresponding shifting sleeves 218, 222, 228 respectively. Only one of the countershaft gears 200, 202, 204 can be engaged at a time. When one of the countershaft gears 200, 202, 204 is engaged by its corresponding shifting sleeve 218, 222, or 228, the rotational motion of the engaged countershaft gear 200, 202 or 204 is transferred to the countershaft 196 by the corresponding shifting sleeve 218, 222, or 228 and the countershaft 196 rotates at the same speed and in the same direction as the engaged countershaft gear 200, 202 or 204.

As best seen in FIG. 7 and mentioned above, the countershaft 196 also has mounted thereon the countershaft gear 234 so as to be rotationally fixed thereto. The countershaft gear 234 is mounted at the right end of the countershaft 196 disposed on a right side of the bearing (not shown). As discussed above, the countershaft gear 234 is selectively engaged by the parking lock lever 236 (when the gear selector 80 is in the parking position P. When the parking lock lever 236 engages the countershaft gear 234, the transmission gear 234 and therefore, the countershaft 196 are prevented from rotating.

Figure 8:
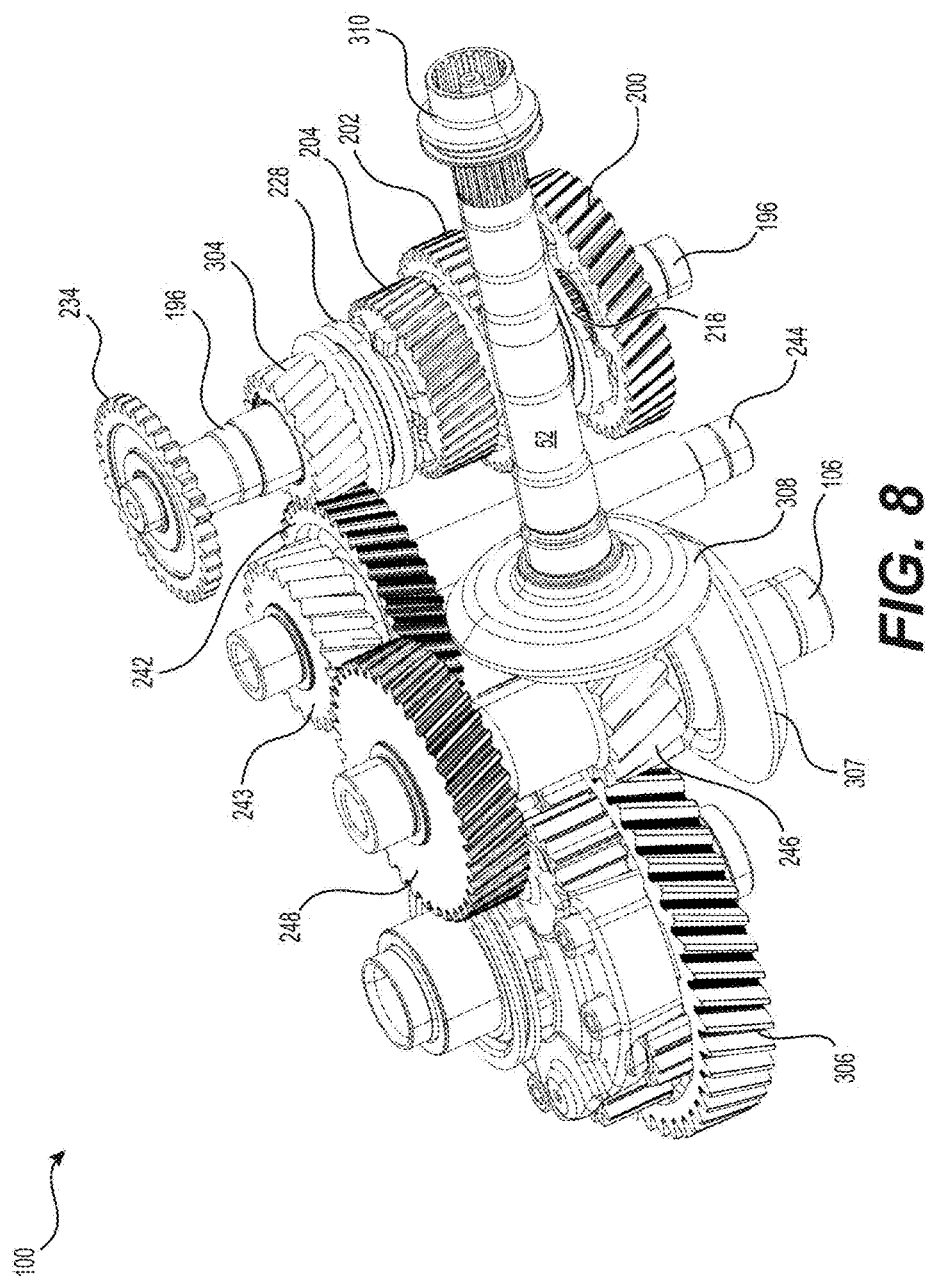
FIG. 8 is a perspective view, taken from a front, bottom and left side of some of the internal components of the transmission of FIG. 3A.

As best seen in FIGS. 7 and 8, the countershaft gear 304 is mounted on the countershaft 196 between the countershaft gear 234 and the countershaft gear 204. As mentioned above, the countershaft gear 304 rotates with the countershaft 196. The countershaft gear 304 causes rotation of the output shaft 106 via an intermediate gear 242. As seen best in FIGS. 7 and 8, the countershaft gear 304 engages the intermediate gear 242 mounted on an intermediate shaft 244 and rotating therewith. The intermediate shaft 244 is parallel to the input shaft 104 and the output shaft 106. The intermediate shaft 244 has another intermediate gear 243 mounted thereon to rotate therewith. The intermediate gear 243 engages and drives a helical output shaft gear 248 mounted on the output shaft 106 to rotate therewith. Thus, when the countershaft 196 rotates, the countershaft gear 304 drives the intermediate gear 242. The intermediate gear 242 drives the intermediate shaft 244 which drives the intermediate gear 243 which drives the output shaft gear 248, and therefore the output shaft 106.

As best seen in FIG. 8, another helical output shaft gear 246 (FIG. 8) is mounted on the output shaft 106 to rotate therewith. The output shaft gear 246 engages and drives the ring gear 306 of the rear differential 56. The output shaft 106 also has a bevel gear 307 mounted thereon that rotates with the output shaft 106. The front shaft 52, which extends perpendicular to the output shaft 106, has a bevel gear 308 mounted at the rear end thereof to rotate therewith. The output shaft bevel gear 307 engages the front shaft bevel gear 308 to drive the front shaft 52. The front driveshaft 58 is selectively connected to the front shaft 52 by an axially moveable sleeve 310.

It is also contemplated that the intermediate shaft 244 and intermediate gear 242 could be omitted and that the output shaft 106 could be driven directly from the countershaft 196. It is contemplated that the gear arrangement used to drive the output shaft 106 from the countershaft 196 could be different than as shown herein. It is contemplated that the countershaft 196 and the output shaft 106 could not be separate shafts. It is contemplated that the countershaft 196 and the output shaft 106 could be replaced by a single output shaft 106 in some implementations of the transmission 100.

When the gear selector lever 80 is placed in the N position, the worm gear 322 rotates the shift drum 154 to a position such that all the countershaft gears 200, 202 204 are disengaged, and the countershaft 196 is not rotating although the input shaft 104 is rotating.

When the gear selector 80 is placed in the park position P, the worm gear 322 rotates the shift drum 154 to a position such that all the countershaft gears 200, 202 204 are disengaged, and the countershaft 196 is not rotating although the input shaft 104 is rotating.

When the gear selector 80 is placed in the R position, the worm gear 322 rotates the shift drum 154 such that the countershaft gear 202 is engaged and rotated by the input shaft gear 194 via the idler gear 206.

When the gear selector 80 is placed in the D position and the low gear switch 82 is activated, the worm gear 322 rotates the shift drum 154 such that the countershaft gear 200 is engaged and rotated by the input shaft gear 190.

When the gear selector 80 is placed in the D position and the high gear switch 84 is activated, the worm gear 322 rotates the shift drum 154 such that the countershaft gear 204 is engaged and rotated by the input shaft gear 194.

When the park position P is selected by the gear selector 80, the segment gear 128 and thereby the parking lock shaft 300 are rotated to a parking position where the parking lock lever 236 engages the countershaft gear 234. The indexing wheel 142 and the indexing lever 146 ensure that the parking lock shaft 300 is in the correct angular orientation for the park position. The worm gear 322 rotates the shift drum shaft 138 to its neutral position N1 in the illustrated implementation of the transmission 100. It is contemplated that the worm gear 322 could rotate the shift drum shaft 138 to one of the other neutral positions N2 or N3 when the park position P is selected by the gear selector 80. In the N1 position, the groove 156 of the shift drum 154 positions the pin 186 such that the shift fork 180 maintains the shifting sleeve 228 in a position disengaged from the countershaft gear 204. In the N1 position, the groove 170 of the shift drum 154 positions the pin 182 such that the shift fork 178 moves the shifting sleeves 218, 222 to a position where the shifting sleeve 218 is disengaged from the countershaft gear 200 and the shifting sleeve 222 is disengaged from the countershaft gear 202. Since none of the countershaft gears 200, 202, 204 are engaged, the countershaft 196 does not rotate even though the input shaft 104 may be rotating. In the park position of the shift parking lock shaft 300, the parking lock lever 236 engages the countershaft gear 234, thus preventing the countershaft 196 and therefore the output shaft 106 and the wheels 14 (and wheels 12 should the all-wheel drive mode be selected) from rotating. The parking lock lever 236 by engaging the countershaft gear 234 therefore prevents the vehicle 10 from moving when, for example, it is parked on a hill.

When the reverse position R is selected by the gear selector 80, the parking lock shaft 300 and segment gear 128 are rotated so that they are not in the park position discussed above, and the parking lock lever 236 does not engage the countershaft gear 234. The worm gear 322 rotates the shift drum shaft 138 and the shift drum 154 therewith to its reverse position R. In the reverse position R, the groove 156 of the shift drum 154 positions the pin 186 such that the shift fork 180 maintains the shifting sleeve 228 in a position where the shifting sleeve 228 is disengaged from the countershaft gear 204. In the reverse position R, the groove 170 of the shift drum 154 positions the pin 182 such that the shift fork 178 moves the shifting sleeves 218, 222 toward a position where the shifting sleeve 218 is disengaged from the countershaft gear 200 and the shifting sleeve 222 is engaged with the countershaft gear 202. There is a possibility that the set of teeth 224 of the shifting sleeve 222 are misaligned with the set of openings 210 of the countershaft gear 202 and as such cannot engage them when the gear selector 80 is moved to the reverse gear position R. In the event that this occurs, the set of teeth 224 of the shifting sleeve 218 come into contact with portions 250 of the countershaft gear 200 located between the openings 208. As a result of the teeth 220 coming into contact with the surface of the gear 202 between the openings 210, the fork rod 178 moves on the fork rod shaft 176 away from the shift arm 184, thereby compressing the spring 302. As the countershaft gear 202 continues to rotate, the teeth 224 of the shifting sleeve 222 are eventually aligned with the openings 210 of the countershaft gear 202 and the spring 302 biases the fork rod 178 back to its default position, which also moves the shifting sleeve 222 toward the countershaft gear 202 such that the teeth 224 of the shifting sleeve 222 engage the openings 210 of the countershaft gear 202. Should the teeth 224 of the shifting sleeve 222 be aligned with the openings 210 of the countershaft gear 202 when the gear selector 80 and shift drum 154 are moved to their reverse positions, the teeth 224 of the shifting sleeve 222 are engaged with the openings 210 of the countershaft gear 202. Once the teeth 224 of the shifting sleeve 222 are engaged with the openings 210 of the countershaft gear 202, the rotational motion of the countershaft gear 202 is transferred to the countershaft 196 and, as described above, to the output shaft 106, the wheels 14, and, should the all-wheel drive mode be selected, the wheels 12. As mentioned above, the countershaft gear 202 rotates in a direction opposite compared to the rotation direction of the countershaft gears 200, 204. As a result, when the reverse gear position R of the gear selector 80 is selected, the vehicle 10 moves rearwardly.

When the transmission 100 is in a low gear driving configuration, the parking lock shaft 300 and segment gear 128 are rotated so that they are not in the park position discussed above, and the parking lock lever 236 does not engage the countershaft gear 234. The worm gear 322 rotates the shift drum shaft 138 and the shift drum 154 therewith to its low gear position L. In the low gear position L, the groove 170 of the shift drum 154 positions the pin 182 such that the shift fork 178 moves the shifting sleeve 218, 222 to a position where the shifting sleeve 218 engages the countershaft gear 200, and the shifting sleeve 222 is disengaged from the countershaft gear 202. In the low gear position L, the groove 156 of the shift drum 154 positions the pin 186 such that the shift fork 180 moves the shifting sleeve 228 toward a position where the shifting sleeve 228 is disengaged from the countershaft gear 204. In the illustrated implementation, the transmission 100 is placed in a low gear driving configuration if the gear selector 80 is placed in the drive position D, the low gear button 82 is activated, and in accordance with the method 700 described below.

When the transmission 100 is in a high gear driving configuration, the parking lock shaft 300 and segment gear 128 are rotated so that they are not in the park position discussed above, and the parking lock lever 236 does not engage the countershaft gear 234. The worm gear 322 rotates the shift drum shaft 138 and the shift drum 154 therewith to its high gear position H. In the high gear position H, the groove 170 of the shift drum 154 positions the pin 182 such that the shift fork 178 moves the shifting sleeves 218, 220 to a position where the shifting sleeve 218 is disengaged from the countershaft gear 200 and the shifting sleeve 222 is disengaged from the countershaft gear 202. In the high gear position H, the groove 156 of the shift drum 154 positions the pin 186 such that the shift fork 180 moves the shifting sleeve 228 toward a position where the shifting sleeve 228 engages the countershaft gear 204. In the illustrated implementation, the transmission 100 is placed in a high gear driving configuration if the gear selector 80 is placed in the drive position D, the high gear button 84 is activated, and in accordance with the method 700 described below.

With reference to FIGS. 12A and 12B, a control system 400 for controlling operation of the transmission 100 will now be described.

An ECU 410 controls operation of the vehicle 10. The ECU 410 receives signals from various sensors in order to control operation of the vehicle 10. The ECU 410 sends signals to various components connected to the engine 40 based on the information received from the various sensors in order to control the operation of the engine 40 and other components of the vehicle 10.

The ECU 410 is connected to a throttle operator position sensor 412 that senses a position APS of the throttle operator 24 (a foot-operated throttle pedal in the illustrated embodiment of the vehicle 10) and sends a signal representative of the throttle operator position APS to the ECU 410. Depending on the type of throttle operator 24, the throttle operator position sensor 412 is generally disposed in proximity to the throttle operator 24 and senses the movement of the throttle operator 24 or the linear displacement of a cable connected to the throttle operator 24.

The ECU 410 is connected to a throttle valve actuator 72 to adjust the position TVP of the throttle valve 70, and thereby the airflow to the engine 40. The throttle valve position TVP is adjusted based in part on the throttle operator position APS as well as on other factors such as the ignition timing IT, required output power P and torque ET, and the like. A throttle valve position sensor 414 senses the position TVP (i.e. the degree of opening) of the throttle valve 70 and sends a signal representative of the position TVP of the throttle valve 70 to the ECU 410. The throttle valve position sensor 414 can be any suitable type of sensor such as a rheostat, hall-effect sensor, potentiometer, and the like.

Depending on the type of throttle valve actuator 72 being used, a separate throttle valve position sensor 414 may not be necessary. For example, a separate throttle valve position sensor 414 would not be required if the throttle valve actuator 72 is a servo motor since servo motors integrate their own feedback circuit that corrects the position of the motor and thus have an integrated throttle valve position sensor 414. In a carbureted engine, the throttle valve 70 is located inside the carburetor and the throttle body 68 is replaced with a carburetor body. For the purposes of the present, the term "throttle body" refers to a carburetor as well as a throttle body.

An engine speed sensor 420 senses the rotational engine speed ES of the output shaft 50 of the engine 40 and sends a signal representative of the engine speed ES to the ECU 410. The engine speed sensor 420 is an inductive sensor coupled to a trigger wheel on the engine output shaft 50. It is contemplated that the engine speed sensor 420 could be coupled to any rotating shaft of the engine 40, such as the crankshaft. The rotation speed ES of the engine 40 can be used by the ECU 410 to calculate the engine torque ET and the power output P of the engine 40.

A driven pulley speed sensor 470 is connected to the shaft on which the driven pulley 46 is mounted. In the illustrated implementation, the driven pulley 46 is mounted on the transmission input shaft 104. The driven pulley speed sensor 470 is an inductive sensor coupled to the transmission inputs shaft 104. The input shaft rotation speed NI is used to prepare CVT ratio calibration tables and/or ratio maps of the input shaft speed NI as a function of the engine speed ES. The CVT ratio maps are defined for stationary operation of the vehicle 10 with no load on the driven pulley 46.

A vehicle speed sensor 430 senses the speed VS of the vehicle 10 and sends a signal representative of the speed VS of the vehicle 10 to the ECU 410 and a display cluster 66. It is contemplated that the vehicle speed sensor 430 could also send a signal representative of the speed VS of the vehicle 10 to the display cluster 66 via the ECU 410. In the illustrated implementation, the vehicle speed sensor 430 is an inductive sensor coupled to the ring gear 306 of the rear differential 56. It is contemplated that the vehicle speed sensor 430 could sense a speed of any shaft driven by the countershaft 196 (i.e. any shaft connected between the countershaft 196 and the wheels 14, 16), to determine the speed of the vehicle 10. It is contemplated that any suitable type of vehicle speed sensor 430 could be used. Alternatively, the vehicle speed sensor 430 could include a global positioning system (GPS unit). By using information from the GPS unit, the speed of the vehicle 10 can be determined by calculating a change in position of the vehicle 10 over a period of time which is normally a function of the GPS unit.

In addition to the throttle valve 70 mentioned above, the ECU 410 is also connected to the fuel injection system 76 for controlling the fuel supply to the engine 40. The ECU 410 is connected to the ignition system 74 to control ignition of the fuel-air mixture in the combustion chamber of the engine 40. For example, the ECU 410 controls the ignition timing IT based partly on the throttle valve position TVP, the throttle operator position APS, and/or engine speed ES.

The ECU 410 is connected to the display cluster 66 to control display of information thereon. The ECU 410 sends signals to the display cluster 66 to display information regarding engine speed, and the like. In the illustrated implementation, the display cluster 66 is directly connected to the vehicle speed sensor 430 for receiving the vehicle speed VS therefrom.

The ECU 410 is connected to the shift drum reference position sensor 450 to and also connected to the potentiometer 460 to receive signals related to the current angular position $PI_{actual}$ of the shift drum 154.

The ECU 410 is connected to the electric motor 320 for actuating the worm gear 322 and thereby rotating the shift drum 154. As mentioned above, the electric motor also has a sensor that provides a redundant signal indicative of the shift drum angular position $PI_{actual}$ and is provided for additional safety.

The shift shaft position sensor 440 is a dual position sensor that has two detectors independently detecting the angular position of the shift shaft 118. Each of the detectors provides a signal indicative of the position of the shift shaft 118. An error condition is detected if the two signals indicative of the angular position of the shift shaft 118 are not in agreement, and an error mode operation is activated when the error condition is detected. In the illustrated implementation, the error mode operation includes a rev limiter mode operation in which the engine speed ES is limited to be below an error threshold engine speed. The error threshold engine speed in the illustrated implementation is smaller than the normal operation engine speed ES for a given throttle operator position APS, but greater than the idle engine speed $ES_{idle}$. It is contemplated that the error condition operation could include other additional operational limitations. It is also contemplated that the error mode operation could be different than in the illustrated implementation.

The vehicle 10 has a vehicle control module (VCM) 411 that is connected to the shift shaft position sensor 440, the L button 82, the H button 84. The VCM 411 determines requests for gear shift from the driver. In the illustrated implementation of the vehicle 10, the VCM 411 is integrated with the ECU 410. It is contemplated that the VCM 411 could be connected to the ECU 410 to provide signals thereto indicative of gear shift requests.

Figure 13:
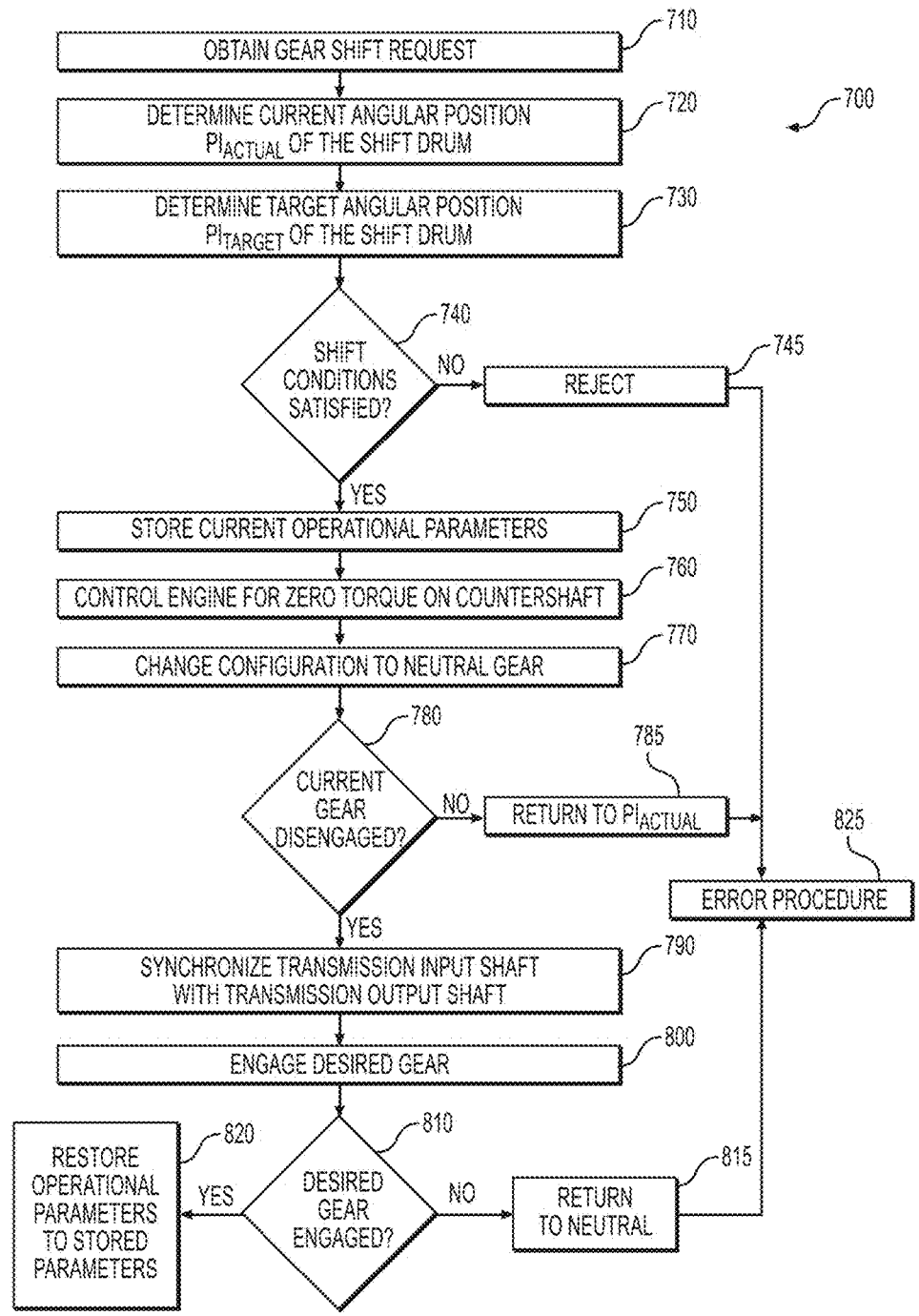
FIG. 13 is a flowchart illustrating a method of controlling operation of the transmission of the vehicle of FIG. 1.
Figure 14:
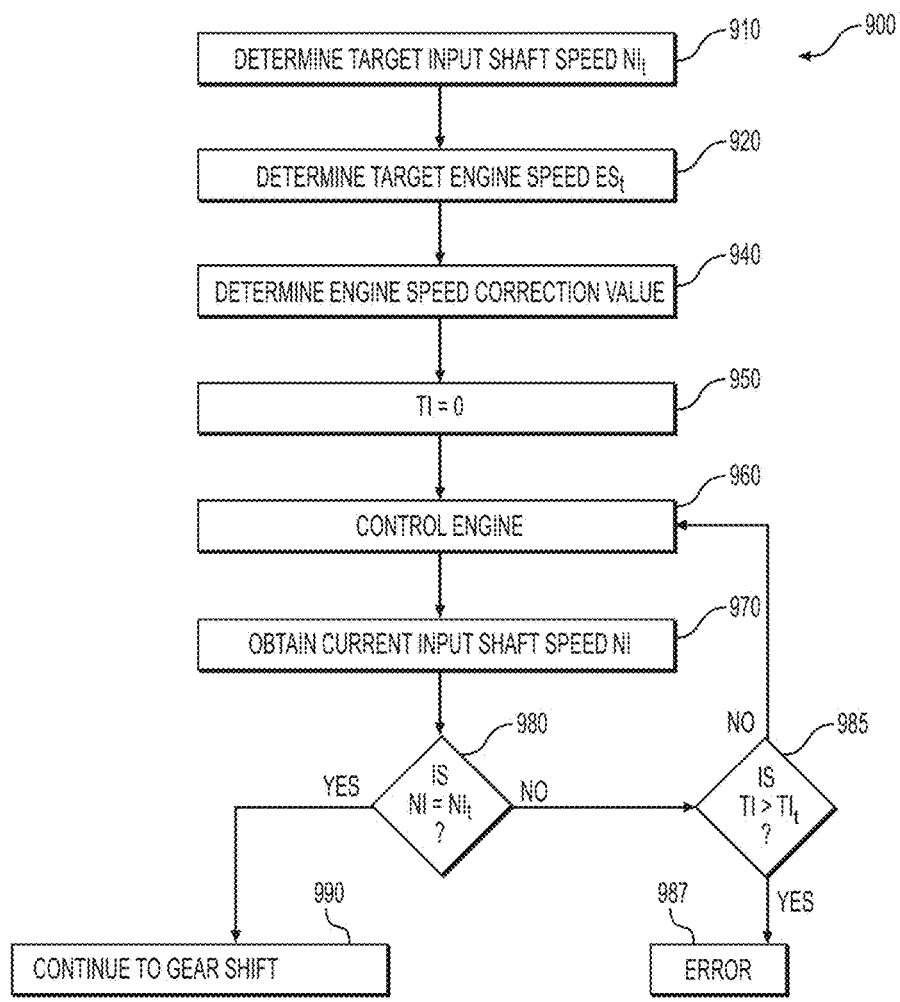
FIG. 14 is a flowchart illustrating the method of controlling the engine for synchronization of an input shaft of the transmission as shown in FIG. 13.

The method 700 for changing a gear driving configuration of the transmission 100 will now be described with reference to FIGS. 13 and 14.

The method is initiated at step 710 where a request for a change to a desired gear driving configuration (i.e. a gear shift request) is determined to have been received. As mentioned above, the driver of the vehicle can request a change from a current gear driving configuration to a desired gear driving configuration by actuating the gear selector 80 and/or activating one of the buttons 82, 84. The ECU 410 determines the occurrence of the gear shift request based on one or more signals received from the vehicle control module 420. It is contemplated that the ECU 410 could be configured to receive one or more signals directly from the shift shaft position sensor 440, from the L button 82, or the H button 84 to determine the gear shift request. The desired gear driving configuration (one of P, R, N, D, L) is obtained from the signals received from the gear selector 80, and the buttons 82, 84.

At step 720, a current angular position $PI_{actual}$ of the shift drum 154 is obtained. The ECU 410 receives a signal from the shift drum angular position sensor 450 indicative of the current angular position $PI_{actual}$ of the shift drum 154.

At step 730, the target angular position $PI_{target}$ of the shift drum 154 is determined. The target angular position $PI_{target}$ of the shift drum 154 is determined based on the current angular position and the requested desired gear driving configuration.

With reference to FIG. 11, the Position Change Request Table defines the target angular position $PI_{target}$ of the shift drum 154 for each combination of current angular position $PI_{actual}$ of the shift drum 154 and requested desired gear driving configuration. For example, if the park gear driving configuration P is requested when the shift drum 154 is currently in the reverse gear R position, the shift drum 154 is rotated to the first neutral position $N_1$. It is contemplated that the shift drum 154 could be configured differently than as shown herein, and that the angular positions corresponding to each gear driving configuration could be arranged in a different pattern or sequence than as shown herein. As another example, when the reverse gear driving configuration R position is requested, the shift drum 154 is first rotated to the second neutral position $N_2$, and then to the reverse position R.

At step 740, the gear shift criteria (conditions) are verified to be true or false (satisfied or unsatisfied). The shift conditions or shift criteria that need to be satisfied before a gear shift can be executed include conditions related to the engine speed ES, the vehicle speed VS (or equivalently the wheel speed $N_w$ in rpm), and the like. The shift conditions for the engine speed ES and vehicle speed VS conditions could include upper limits and lower limits thereof. In addition, the shift conditions could in some implementations include the presence of an error mode, for example, a requested gear shift may be disallowed if an error condition is detected. If the shift conditions are determined to be satisfied, the method 700 proceeds to step 750 to continue with the execution of the change to the requested desired gear driving configuration.

If the shift conditions are determined to be unsatisfied at step 740, and if the system 400 is unable to establish the required shift conditions, the method 700 proceeds to step 745.

At step 745, the failure of the gear shift operation is indicated. In the illustrated implementation, the failure to execute the gear shift request is indicated by flashing a red indicator light provided therefor on the display cluster 66. It is contemplated that the indication could be in the form of a textual message, a sound, or the like.

At step 750, the current operational parameters of the vehicle 10 are stored so that these current operation parameters can be restored after the execution of the shift request, i.e. after the gear driving configuration has been changed to the desired gear driving configuration. In the illustrated embodiment of the vehicle 10, the stored current operation parameter is the current engine torque requested $ET_{request}$. The engine torque requested is determined based on factors such as, but not limited to, the throttle operator position APS and the vehicle operation mode (economy, sport, standard, for example). It is contemplated that additional operation parameters could also be stored, such as the engine speed, vehicle speed, engine speed limits and the like. These current operational parameters are stored in a cache memory in the ECU 410, but it is contemplated that the memory for storing current operational parameters of the vehicle 10 could be stored in another location, or more than one location.

At step 760, the operation of the engine 40 is controlled to obtain a condition of zero torque on the countershaft 196. The ECU 410 accordingly sends control signal to one or more of the ignition system 74, the fuel injection system 76, and the throttle valve actuator 72.

At step 770, the gear driving configuration is changed to the neutral gear driving configuration by rotating the shift drum 154 to a neutral ($N_1$, $N_2$, or $N_3$) position in accordance with the Position Change Request Table.

At step 780, the disengagement of the current gear driving configuration (gear driving configuration when the request for a change to the desired gear driving configuration is received) and the change to the neutral gear driving configuration is verified. If an error is detected at step 780, the method 400 proceeds to step 785 where the shift drum 154 is returned to the current angular position (as determined at step 720) by rotating the shift drum 154 to its original position at step 720. If at step 780, the shift drum 154 is determined to have successfully moved to the neutral position ($N_1$, $N_2$, or $N_3$), the method proceeds to step 790.

At step 790, the engine 40 is controlled such that the input shaft 104 is synchronized with the countershaft 196 for the desired gear driving configuration and for the current vehicle speed VS. In a transmission 100 where the countershaft 196 and output shaft 106 are replaced by a single output shaft, the input shaft 104 is synchronized with the output shaft 106 for the desired gear driving configuration. The input shaft 104 is synchronized with the countershaft 196 when the rotational speed of the transmission input shaft 104 is equal to a target input shaft speed $NI_t$ given by:

$$NI_t = NW/(i_d * i_{end})$$

where NW is the rotational speed of the vehicles wheels 14, 16 related to the linear vehicle speed VS. The wheel speed NW is determined by the vehicle speed sensor 430. $i_d$ is the desired gear ratio for the desired gear driving configuration, and the $i_{end}$ is the end ratio of the countershaft 196 to the wheels 12, 14.

The target input shaft speed $NI_t$ is achieved by controlling the engine 40 to change the engine speed ES. The engine 40 is controlled by adjusting one or more of the ignition timing, the fuel injection rate and the throttle valve position TVP. The ECU 410 accordingly sends control signal to one or more of the ignition system 74, the fuel injection system 76, and the throttle valve actuator 72. An implementation of a method 900 of controlling the engine 40 at step 790 will be described below with reference to FIG. 14.

At step 800, the shift drum 154 is rotated to the target angular position $PI_{target}$ to change the gear driving configuration to the desired gear driving configuration. The target angular position $PI_{target}$ is determined from the Position Change Request Table.

At step 810, the rotation of the shift drum 154 to the target angular position $PI_{target}$ is verified. If an error is detected at step 810 in the rotation of the shift drum 154 to the target angular position $PI_{target}$, the method 800 proceeds to step 815 where the shift drum 154 is returned to the neutral position $N_1$, $N_2$, or $N_3$, by rotating the shift drum 154 to its neutral position at step 780. If at step 810, the shift drum 154 is determined to have successfully moved to the target angular position $PI_{target}$, confirming that the change to the desired gear driving configuration has been achieved (i.e. the desired gear has been engaged), the method proceeds to step 820.

At step 820, the vehicle 10 is restored to the stored current operational parameters (stored at step 750). The engine 40 is controlled to obtain the stored engine torque ET. The ECU 410 accordingly sends control signal to one or more of the ignition system 74, the fuel injection system 76, and the throttle valve actuator 72. To restore the operational parameters to their respective values at step 750, the operational parameters are varied from their values at the synchronization step 790 to the stored values at step 750 according to predefined ramping models. The predefined ramping models are based on factors such as the driving conditions, the driving mode, driver preference, fuel economy, and the like.

In the illustrated implementation, the ramping models are defined for a smooth transition but it is contemplated that the transition for restoration of operational parameters to their values at step 750 could be achieved in a series of discrete steps.

After execution of any one of the steps 745, 785, and 815 (following respectively, the occurrence of an error or failure at the step 740, 780 and 810), the method 700 proceeds to step 825 where an error procedure is executed. The error procedure could include limiting actions such limiting the engine speed ES, limiting an engine torque ET, limiting a vehicle speed VS, and the like. It is contemplated that the error procedure of step 825 could include an error indication, for example, by activating an indicator light, presenting a textual message, an audible sound, and the like.

The method 900 for controlling the engine 40 for synchronization of the input shaft 104 with the output shaft 106 will now be described with respect to FIG. 14.

For the illustrated implementation of the transmission 100, the method 900 relates to synchronization of the input shaft 104 with the countershaft 196 of the transmission 100. As mentioned above, in some implementations of the transmission 100, the countershaft 196 and the output shaft 106 could be replaced by a single output shaft 106. The method 900 generally relates to synchronization of the input shaft 104 with the output shaft 106 of the transmission 100.

At step 910, the target input shaft speed $NI_t$ is determined for synchronization of the input shaft 104 with the countershaft 196. As mentioned above, the target input shaft speed $NI_t$ based on the desired gear driving configuration and the current vehicle speed VS (vehicle speed when the driver of the vehicle 10 requests the gear shift). The target input shaft speed $NI_t$ is achieved by regulating the engine speed ES to obtain a target engine speed $ES_t$.

At step 920, the target engine speed $ES_t$ is determined for achieving the target input shaft speed $NI_t$. The ECU 410 has access to CVT ratio maps that define driven pulley speed (same as the input shaft speed NI in the illustrated implementation) as a function of engine speed ES. The target engine speed $ES_t$ for obtaining the target input shaft speed $NI_t$ is determined from the CVT ratio maps.

In the illustrated implementation, the engine speed ES is regulated by PID-type (proportional-integral-derivative) controller module of the ECU 410 during execution of a gear shift (i.e. while changing the gear driving configuration to the desired gear driving configuration). In normal or default operation of the engine 40 (i.e. when a gear shift is not being executed), the operation of the engine 40 is controlled by the ECU 410 based on the requested engine torque $ET_{request}$ and based on an engine speed limit $ES_{limit}$. The requested engine torque $ET_{request}$ is based on the throttle operator position APS and the load on the vehicle 10 in normal operation of the engine 40. The engine 40 is thus controlled based on the torque requested by the driver during normal or default operation of the engine 40. The engine speed limit $ES_{limit}$ is based on driving conditions, driving mode, and the like, during normal or default operation of the engine 40. During the execution of a gear shift, the PID controller requests an engine torque $ET_{gear\ shift}$ that is based on the target engine speed $ES_t$. Thus, during execution of the gear shift, the ECU 410 overrides the requested engine torque based on the throttle operator position APS by the gear shift engine torque $ET_{gear\ shift}$.

At step 940, an engine speed correction value ΔES is obtained for controlling the engine 40. The input shaft speed NI approaches the target input shaft speed $NI_t$ in an oscillatory manner as the engine speed ES is varied to achieve the target engine speed $ES_t$. It is contemplated that the engine speed ES could be varied to achieve the target engine speed $ES_t$ such that the input shaft speed NI approaches the target input shaft speed $NI_t$ in a non-oscillatory manner, for example, in a monotonic manner. In order to speed up the process for achieving the target input shaft speed $NI_t$, the PID controller uses correction values ΔES obtained from previously stored correction tables for optimizing the starting value for the changing the engine speed to the target engine speed $ES_t$. The correction tables contain engine speed correction values as a function of the input shaft speed ΔES (NI) for different ranges of increase and decrease of the input shaft speed NI.

At step 950, a timer value TI is initialized to zero. The timer value TI is used to determine whether the synchronization has successfully completed or not as will described below.

At step 960, the engine 40 is controlled by the ECU 410.

At step 970, the current input shaft speed NI is measured by the driven pulley sensor 470.

At step 980, the input shaft speed NI is compared to the target input shaft speed $NI_t$ to determine whether the target input shaft speed $NI_t$ has been achieved. The input shaft speed NI is considered to have achieved the target value $NI_t$ when the input shaft speed NI is within a predefined range $NI_r$ of the target value NIt. In other words when the difference between the target value and the input shaft speed NI has a magnitude less than a predefined range $NI_r$, i.e. $|NI-NI_t| \le NI_r$, the input shaft 104 is considered to be synchronized with the countershaft 196. At step 980, if the target input shaft speed $NI_t$ is determined to have been achieved, the method 900 proceeds to step 990 to change the gear driving configuration to the desired gear driving configuration (step 800 of FIG. 13).

At step 980, if the target input shaft speed $NI_t$ is determined to not have been achieved, the method 900 proceeds to step 985 to determine if a determine if the time lapsed TI since the start of control of the engine 40 for synchronization of the input shaft 104 has exceeded a threshold time $TI_t$. In the illustrated implementation, the method 900 waits for a predefined period of time $TI_t$ for the target input shaft speed $NI_t$ to be achieved. If at step 985, the time lapsed TI has not exceeded the threshold $Ti_t$, the method 900 returns to step 940 to continue controlling the engine 40.

If the target input shaft speed $NI_t$ is not achieved within the predefined time $TI_t$, an error is considered to have occurred, and the ECU 410 aborts the execution of the gear shift by executing an error routine at step 987 similar to the error routine discussed above with reference to FIG. 13.

Modifications and improvements to the above-described implementations of the present vehicle may become apparent to those skilled in the art. The foregoing description is intended to be exemplary rather than limiting. The scope of the present technology is therefore intended to be limited solely by the scope of the appended claims.

What is claimed is:
1. A method for changing a gear driving configuration of a discrete gear transmission in a powertrain of a vehicle, the powertrain comprising:
   an engine;
   an engine control unit (ECU) for controlling an operation of the engine;
   a continuously variable transmission (CVT) having a driving pulley operatively connected to the engine and a driven pulley;
   the discrete gear transmission (DGT) operatively connecting the CVT to at least one wheel of the vehicle, the DGT including:
      a DGT input shaft operatively connected to the driven pulley of the CVT;
      a DGT output shaft configured to be operatively connected to the at least one wheel of the vehicle;
      a plurality of gears having a plurality of gear driving configurations, the DGT output shaft being selectively operatively connected to the DGT input shaft based on the plurality of gear driving configurations of the plurality of gears,
   the method comprising,
   responsive to a gear shift request for changing a current gear driving configuration to a desired gear driving configuration of the plurality of gear driving configurations of the plurality of gears:
      determining a target driven pulley speed for synchronizing the DGT input shaft with the DGT output shaft for the desired gear driving configuration;
      determining a target engine speed corresponding to the determined target driven pulley speed;
      controlling the engine to change an engine speed to the target engine speed; and
      responsive to the DGT input shaft being synchronized with the DGT output shaft for the desired gear driving configuration, changing the current gear driving configuration of the plurality of gears to the desired gear driving configuration.

2. The method of claim 1, wherein the target engine speed is determined based on a predefined ratio map of driven pulley speed as a function of one of: a driving pulley speed and the engine speed.

3. The method of claim 1, wherein the target driven pulley speed is determined based on a vehicle speed and the desired gear driving configuration.

4. The method of claim 1, wherein controlling the engine to change the engine speed to the target engine speed comprises:
   obtaining the engine speed;
   obtaining the driven pulley speed;
   obtaining, from a predefined correction table of a plurality of engine speed correction values as a function of driven pulley speed, an engine speed correction value corresponding to the target driven pulley speed and a current driven pulley speed; and
   controlling the operation of the engine in accordance with the obtained engine speed correction value.

5. The method of claim 1, further comprising:
   initializing a timer before controlling the engine to change engine speed to the target engine speed, and wherein:
   controlling the engine to change engine speed to the target engine speed comprises:
      determining if the driven pulley speed is within a predefined range about the target driven pulley speed;
      determining if a timer value of the timer has exceeded a predefined threshold timer value;
      responsive to the driven pulley speed being outside a predefined range about the target driven pulley speed and the timer value exceeding the predefined threshold timer value, initiating an error procedure; and
      responsive to the driven pulley speed being outside a predefined range of the target driven pulley speed and the timer value being less than the predefined threshold timer value, continuing controlling the engine to obtain the target engine speed.

6. The method of claim 1, wherein changing the current gear driving configuration to the desired gear driving configuration comprises:
- changing the current gear driving configuration of the plurality of gears to a neutral gear driving configuration before controlling the engine to change the engine speed to the target engine speed; and
- changing the neutral gear driving configuration of the plurality of gears to the desired gear driving configuration after controlling the engine to change the engine speed to the target engine speed and if the desired gear driving configuration is other than the neutral gear driving configuration.

7. The method of claim 6, wherein changing the current gear driving configuration of the plurality of gears to the neutral gear driving configuration comprises:
- controlling the engine to minimize torque on the DGT output shaft before changing the current gear driving configuration of the plurality of gears to the neutral gear driving configuration.

8. The method of claim 6, wherein changing the current gear driving configuration to the desired gear driving configuration further comprises:
- storing a value of an operational parameter of the vehicle before changing the current gear driving configuration of the plurality of gears to the neutral gear driving configuration, the value of the operational parameter being a stored value of the operational parameter; and
- after changing the current gear driving configuration to the desired gear driving configuration, restoring operation of the vehicle to return the operational parameter to the stored value of the operational parameter.

9. The method of claim 8, wherein the operational parameter is an engine torque request.

10. The method of claim 8, wherein returning the operational parameter to the stored value of the operational parameter comprises returning the operational parameter to the stored value of the operational parameter in accordance with a predefined ramping model.

11. The method of claim 6, wherein changing the current gear driving configuration of the plurality of gears to the neutral gear driving configuration occurs responsive to a shift condition being satisfied.

12. The method of claim 1, wherein:
the DGT comprises:
- a shift drum being moveable to any one of a plurality of positions, each position of the plurality of positions corresponding to one of the plurality of gear driving configurations of the plurality of gears, the shift drum being moveable from any one position of the plurality of positions to any other position of the plurality of positions in any one of two directions of actuation; and
- a shift drum actuator operatively connected to the shift drum for actuating the shift drum to any one of the plurality of positions, the ECU being communicatively coupled to the shift drum actuator for controlling actuation of the shift drum; and
changing the current gear driving configuration of the plurality of gears to the desired gear driving configuration comprises:
- determining a current position of the shift drum corresponding to the current gear driving configuration;
- determining a target position of the shift drum corresponding to the desired gear driving configuration of the plurality of gears; and
- actuating the shift drum in one of the two directions of actuation to dispose the shift drum in the target position, the one of the two directions of actuation being selected based on the current position of the shift drum and the target position of the shift drum.

13. The method of claim 12, wherein changing the current gear driving configuration of the plurality of gears to the desired gear driving configuration comprises:
- changing the current gear driving configuration of the plurality of gears to a neutral gear driving configuration before controlling the engine to change engine speed to the target engine speed; and
- changing the neutral gear driving configuration of the plurality of gears to the desired gear driving configuration after controlling the engine to change engine speed to the target engine speed,
wherein:
- the plurality of positions of the shift drum includes at least a first neutral position corresponding to the neutral gear driving configuration and a second neutral position corresponding to the neutral gear driving configuration; and
- changing the current gear driving configuration of the plurality of gears to the neutral gear driving configuration before controlling the engine to change engine speed to the target engine speed comprises actuating the shift drum to move the shift drum from the current position to an intermediate position before controlling the engine to change engine speed to the target engine speed; and
- changing the neutral gear driving configuration of the plurality of gears to the desired gear driving configuration after controlling the engine to change engine speed to the target engine speed comprises actuating the shift drum to move the shift drum from the intermediate position to the target position,
- the intermediate position being one of the first neutral position and the second neutral position, the intermediate position being selected based on the current position and the target position.

14. The vehicle of claim 1, wherein the DGT further comprises:
- a parking lock shaft rotatable independently of the shift drum, the parking lock shaft being rotatable to a lock position to prevent rotation of the DGT output shaft, the parking lock shaft being operatively connected to the gear selector for being rotated to the lock position.

15. The vehicle of claim 1, wherein the shift drum is rotatable by 360 degrees.

16. The vehicle of claim 1, further comprising:
- a shift drum position sensor coupled to at least one of the shift drum and the shift drum actuator, the shift drum position sensor being communicatively connected to the ECU to send a signal thereto indicative of a current position of the shift drum.

17. A vehicle comprising:
a frame;
at least one wheel connected to the frame;
an engine supported by the frame;
an engine control unit (ECU) configured to control an operation of the engine;
a continuously variable transmission (CVT) having a driving pulley operatively connected to the engine and a driven pulley;
a discrete gear transmission (DGT) comprising:
- a DGT input shaft operatively connected to the driven pulley of the CVT;

a plurality of gears being disposed in one of a plurality of gear driving configurations;

a DGT output shaft being selectively driven by the DGT input shaft based on the gear driving configuration of the plurality of gears and being operatively connected to the at least one wheel;

a shift drum being rotatable to any one of a plurality of angular positions, each angular position of the plurality of angular positions corresponding to one of the plurality of gear driving configurations; and a shift drum actuator being operatively connected to the shift drum for actuating the shift drum, the ECU being communicatively coupled to the shift drum actuator for controlling actuation of the shift drum;

a gear selector operable by a driver of the vehicle to select a desired gear driving configuration of the plurality of gear driving configurations, the gear selector being communicatively coupled to the ECU for providing a signal indicative of gear shift request for the desired gear driving configuration;

an engine speed sensor configured to sense a rotational speed of one of: the driving pulley and a first element connected between the engine and the driving pulley, the engine speed sensor being communicatively coupled to the ECU for sending a engine speed signal thereto indicative of the engine speed;

a driven pulley speed sensor configured to sense a rotational speed of one of: the driven pulley, the DGT input shaft and a second element connected between the driven pulley and the DGT input shaft, the driven pulley speed sensor communicatively coupled to the ECU for sending a signal thereto indicative of a driven pulley speed of the driven pulley, the ECU being configured to determine a target engine speed responsive to receiving the signal indicative of the gear shift request and to control the engine to change the engine speed to the target engine speed, the target engine speed being determined based on a target driven pulley speed for the desired gear driving configuration, the target driven pulley speed being determined to synchronize the DGT input shaft with the DGT output shaft for the desired gear driving configuration, the ECU being further configured to control the shift drum actuator to rotate the shift drum to the angular position of the plurality of angular positions corresponding to the desired gear driving configuration responsive to the DGT input shaft being synchronized with the DGT output shaft.

18. The vehicle of claim 17, wherein the ECU has access to a ratio map of driven pulley speed as a function of engine speed, and the target engine speed is determined based on the ratio map.

19. The vehicle of claim 17, further comprising a vehicle speed sensor configured to sense a rotational speed of one of:
the at least one wheel;
the DGT output shaft; and
a third element connected between the DGT output shaft and the at least one wheel, the vehicle speed sensor being communicatively coupled to the ECU to send a signal thereto indicative of a vehicle speed, the target driven pulley speed is determined based on the vehicle speed when the gear shift request is received.

20. A powertrain for a vehicle, the powertrain comprising:
an engine;
an engine control unit (ECU) configured to control an operation of the engine;
a continuously variable transmission (CVT) having a driving pulley operatively connected to the engine and a driven pulley;
a discrete gear transmission (DGT) comprising:
  a DGT input shaft operatively connected to the driven pulley of the CVT;
  a plurality of gears being disposed in one of a plurality of gear driving configurations;
  a DGT output shaft being selectively driven by the DGT input shaft based on the gear driving configuration of the plurality of gears and being configured to be operatively connected to at least one wheel of the vehicle;
  a shift drum being rotatable to any one of a plurality of angular positions, each angular position of the plurality of angular positions corresponding to one of the plurality of gear driving configurations of the plurality of gears; and
  a shift drum actuator being operatively connected to the shift drum for actuating the shift drum, the ECU being communicatively coupled to the shift drum actuator for controlling actuation of the shift drum;
an engine speed sensor configured to sense a rotational speed of one of: the driving pulley and a first element connected between the engine and the driving pulley, the engine speed sensor being communicatively coupled to the ECU for sending a engine speed signal thereto indicative of the engine speed; and
a driven pulley speed sensor configured to sense a rotational speed of one of: the driven pulley, the DGT input shaft and a second element connected between the driven pulley and the DGT input shaft, the driven pulley speed sensor communicatively coupled to the ECU for sending a signal thereto indicative of a driven pulley speed of the driven pulley, the ECU being configured to determine a target engine speed responsive to receiving the signal indicative of a gear shift request to a desired gear driving configuration and to control the engine to change the engine speed to the target engine speed, the target engine speed being determined based on a target driven pulley speed for the desired gear driving configuration, the target driven pulley speed being determined to synchronize the DGT input shaft with the DGT output shaft for the desired gear driving configuration, the ECU being further configured to control the shift drum actuator to rotate the shift drum to the angular position of the plurality of angular positions corresponding to the desired gear driving configuration responsive to the DGT input shaft being synchronized with the DGT output shaft.

\* \* \* \* \*